US009829882B2

(12) United States Patent
MacGregor et al.

(10) Patent No.: US 9,829,882 B2
(45) Date of Patent: Nov. 28, 2017

(54) SELF-PROPELLED DEVICE WITH CENTER OF MASS DRIVE SYSTEM

(71) Applicant: Sphero, Inc., Boulder, CO (US)

(72) Inventors: Ross MacGregor, Erie, CO (US); Ian H. Bernstein, Boulder, CO (US); Adam Wilson, Longmont, CO (US)

(73) Assignee: SPHERO, INC., Boulder, CO (US)

( * ) Notice: Subject to any disclaimer, the term of this patent is extended or adjusted under 35 U.S.C. 154(b) by 0 days.

(21) Appl. No.: 14/137,954

(22) Filed: Dec. 20, 2013

(65) Prior Publication Data

US 2015/0175202 A1 Jun. 25, 2015

(51) Int. Cl.
| | |
|---|---|
| *G05D 1/00* | (2006.01) |
| *G05D 3/00* | (2006.01) |
| *G06F 7/00* | (2006.01) |
| *B62D 61/00* | (2006.01) |
| *B60K 1/04* | (2006.01) |
| *B60K 7/00* | (2006.01) |
| *B62K 11/00* | (2006.01) |
| *B60K 17/04* | (2006.01) |

(52) U.S. Cl.
CPC .............. *G05D 1/0011* (2013.01); *B60K 1/04* (2013.01); *B60K 7/0007* (2013.01); *B62D 61/00* (2013.01); *B62K 11/007* (2016.11); *B60K 17/043* (2013.01); *B60K 2001/0438* (2013.01); *B60Y 2200/81* (2013.01); *G05D 2201/02* (2013.01)

(58) Field of Classification Search
CPC ........ A63H 11/00; A63H 11/02; B62K 3/007; B62K 11/007; G05D 1/0011; B60K 1/04; B60K 31/00; B62D 61/00

USPC ....... 701/2; 700/245; 446/273, 325; 180/218
See application file for complete search history.

(56) References Cited

U.S. PATENT DOCUMENTS

| 90,546 A | * | 5/1869 | Huntington | ........... B62K 17/00 |
|---|---|---|---|---|
| | | | | 280/208 |
| 933,623 A | | 9/1909 | Cecil | |
| 1,263,262 A | | 4/1918 | McFaul | |
| 2,796,601 A | | 11/1956 | Hagopian | |
| 2,949,696 A | | 8/1960 | Easterling | |
| 2,977,714 A | * | 4/1961 | Gibson | ............... A63H 33/005 |
| | | | | 446/458 |

(Continued)

FOREIGN PATENT DOCUMENTS

| CA | 102060060 | 5/2011 |
|---|---|---|
| CN | 1302717 | 7/2001 |

(Continued)

OTHER PUBLICATIONS

US 9,342,073, 05/2016, Berstein et al. (withdrawn)

(Continued)

*Primary Examiner* — Isaac Smith
(74) *Attorney, Agent, or Firm* — Merchant & Gould P.C.

(57) ABSTRACT

A self-propelled device is disclosed that includes a center of mass drive system. The self-propelled device includes a substantially cylindrical body and wheels, with each wheel having a diameter substantially equivalent to the body. The self-propelled device may further include an internal drive system with a center of mass below a rotational axis of the wheels. Operation and maneuvering of the self-propelled device may be performed via active displacement of the center of mass.

20 Claims, 8 Drawing Sheets

(56) References Cited

U.S. PATENT DOCUMENTS

| | | | |
|---|---|---|---|
| 3,313,365 A * | 4/1967 | Jackson | B62D 37/04 |
| | | | 180/218 |
| 3,667,156 A * | 6/1972 | Tomiyama | A63H 33/005 |
| | | | 446/458 |
| 3,683,216 A | 8/1972 | Post | |
| 3,821,995 A | 7/1974 | Aghnides | |
| 4,310,987 A * | 1/1982 | Chieffo | A63H 29/22 |
| | | | 446/175 |
| 4,519,466 A | 5/1985 | Shiraishi | |
| 4,541,814 A | 9/1985 | Martin | |
| 4,601,675 A | 7/1986 | Robinson | |
| 4,733,737 A | 3/1988 | Falamak | |
| 4,897,070 A * | 1/1990 | Wagstaff | A63H 33/005 |
| | | | 180/6.5 |
| 4,996,468 A | 2/1991 | Field et al. | |
| 5,087,000 A | 2/1992 | Suto | |
| 5,213,176 A | 5/1993 | Oroku et al. | |
| 5,297,981 A | 3/1994 | Maxim et al. | |
| 5,342,051 A | 8/1994 | Rankin et al. | |
| 5,413,345 A | 5/1995 | Nauck | |
| 5,439,408 A | 8/1995 | Wilkinson | |
| 5,489,099 A | 2/1996 | Rankin et al. | |
| 5,513,854 A | 3/1996 | Daver | |
| 5,595,121 A | 1/1997 | Elliot | |
| 5,628,232 A | 5/1997 | Bakholdin et al. | |
| 5,644,139 A | 7/1997 | Allen et al. | |
| 5,676,582 A | 10/1997 | Lin | |
| 5,739,657 A | 4/1998 | Takayama et al. | |
| 5,759,083 A | 6/1998 | Polumbaum et al. | |
| 5,780,826 A | 7/1998 | Hareyama et al. | |
| 5,793,142 A | 9/1998 | Richard | |
| 5,871,386 A * | 2/1999 | Bart | A63H 15/06 |
| | | | 446/443 |
| 5,952,796 A | 9/1999 | Colgate et al. | |
| 5,953,056 A | 9/1999 | Tucker | |
| 6,144,128 A | 11/2000 | Rosen | |
| 6,227,933 B1 | 5/2001 | Michaud et al. | |
| 6,246,927 B1 | 6/2001 | Dratman | |
| 6,315,667 B1 | 11/2001 | Steinhart | |
| 6,320,352 B2 | 11/2001 | Terazoe | |
| 6,390,213 B1 | 5/2002 | Bleicher | |
| 6,439,956 B1 | 7/2002 | Ho | |
| 6,449,010 B1 | 9/2002 | Tucker | |
| 6,456,938 B1 | 9/2002 | Bernard | |
| 6,458,008 B1 | 10/2002 | Hyneman | |
| 6,459,955 B1 | 10/2002 | Bartsch et al. | |
| 6,502,657 B2 | 1/2003 | Kerrebrock et al. | |
| 6,535,793 B2 | 3/2003 | Allard | |
| 6,573,883 B1 | 6/2003 | Bartlett | |
| 6,584,376 B1 | 6/2003 | Van Kammer | |
| 6,615,109 B1 | 9/2003 | Matsuoka et al. | |
| 6,764,373 B1 | 7/2004 | Osawa et al. | |
| 6,785,590 B2 | 8/2004 | Kasuga et al. | |
| 6,786,795 B1 | 9/2004 | Mullaney et al. | |
| 6,789,768 B1 | 9/2004 | Kalisch | |
| 6,856,696 B1 | 2/2005 | Ajioka | |
| 6,901,110 B1 | 5/2005 | Tsougarakis et al. | |
| 6,902,464 B1 * | 6/2005 | Lee | A63H 5/00 |
| | | | 446/409 |
| 6,945,843 B1 | 9/2005 | Motosko | |
| 6,980,956 B1 | 12/2005 | Takagi et al. | |
| 7,058,205 B2 | 6/2006 | Jepson et al. | |
| 7,069,113 B2 | 6/2006 | Matsuoka et al. | |
| 7,130,741 B2 | 10/2006 | Bodin et al. | |
| 7,170,047 B2 | 1/2007 | Pal | |
| 7,173,604 B2 | 2/2007 | Marvit et al. | |
| 7,258,591 B2 | 8/2007 | Xu et al. | |
| 7,283,647 B2 | 10/2007 | McNitt | |
| 7,292,711 B2 | 11/2007 | Kiraly et al. | |
| 7,298,869 B1 | 11/2007 | Abernathy | |
| 7,324,663 B2 | 1/2008 | Kiraly et al. | |
| 7,328,671 B2 | 2/2008 | Kates | |
| 7,340,077 B2 | 3/2008 | Gokturk et al. | |
| 7,340,344 B2 | 3/2008 | Chappell | |
| 7,344,430 B2 | 3/2008 | Hasty et al. | |
| 7,409,924 B2 | 8/2008 | Kates | |
| 7,424,867 B2 | 9/2008 | Kates | |
| 7,432,718 B2 | 10/2008 | Ishihara et al. | |
| 7,463,001 B2 | 12/2008 | Tsurukawa | |
| 7,501,780 B2 | 3/2009 | Yamamoto | |
| 7,526,362 B2 | 4/2009 | Kim et al. | |
| 7,542,597 B2 | 6/2009 | Rahn et al. | |
| 7,639,874 B2 | 12/2009 | Bushell et al. | |
| 7,699,683 B2 | 4/2010 | Caspi | |
| 7,702,131 B2 | 4/2010 | Chinen et al. | |
| 7,714,880 B2 | 5/2010 | Johnson | |
| 7,714,895 B2 | 5/2010 | Pretlove et al. | |
| 7,726,422 B2 | 6/2010 | Sun et al. | |
| 7,755,660 B2 | 7/2010 | Nejikovsky et al. | |
| 7,822,507 B2 | 10/2010 | Ishihara et al. | |
| 7,847,504 B2 | 12/2010 | Hollis | |
| 7,853,357 B2 | 12/2010 | Sawada et al. | |
| 7,889,226 B2 | 2/2011 | Pescatore et al. | |
| 7,957,837 B2 | 6/2011 | Ziegler et al. | |
| 7,979,162 B2 | 7/2011 | Niemela et al. | |
| 8,025,551 B2 | 9/2011 | Torres et al. | |
| 8,038,504 B1 | 10/2011 | Wong | |
| 8,099,189 B2 | 1/2012 | Kaznov et al. | |
| 8,128,450 B2 | 3/2012 | Imai | |
| 8,128,500 B1 | 3/2012 | Borst et al. | |
| 8,142,287 B2 | 3/2012 | Podoloff | |
| 8,144,118 B2 | 3/2012 | Hildreith | |
| 8,180,436 B2 | 5/2012 | Boyden et al. | |
| 8,190,295 B1 | 5/2012 | Garretson | |
| 8,195,333 B2 | 6/2012 | Ziegler et al. | |
| 8,197,298 B2 | 6/2012 | Willett | |
| 8,210,289 B1 | 7/2012 | Lu et al. | |
| 8,258,917 B2 | 9/2012 | Cai et al. | |
| 8,269,447 B2 | 9/2012 | Smoot et al. | |
| 8,274,406 B2 | 9/2012 | Karlsson et al. | |
| 8,275,544 B1 | 9/2012 | Wells et al. | |
| 8,326,469 B2 | 12/2012 | Phillips et al. | |
| 8,330,639 B2 | 12/2012 | Wong et al. | |
| 8,352,643 B2 | 1/2013 | Birnbaum et al. | |
| 8,355,818 B2 | 1/2013 | Nielsen et al. | |
| 8,364,136 B2 | 1/2013 | Hoffberg et al. | |
| 8,376,756 B2 | 2/2013 | Robb | |
| 8,392,065 B2 | 3/2013 | Tolstedt et al. | |
| 8,396,611 B2 | 3/2013 | Phillips et al. | |
| 8,400,619 B1 | 3/2013 | Bernstein et al. | |
| 8,417,384 B2 | 4/2013 | Togawa et al. | |
| 8,430,192 B2 | 4/2013 | Gillett | |
| 8,442,661 B1 | 5/2013 | Blackwell et al. | |
| 8,456,298 B2 | 6/2013 | Valtonen | |
| 8,459,383 B1 | 6/2013 | Burget | |
| 8,522,902 B2 | 9/2013 | Gomi et al. | |
| 8,540,038 B1 | 9/2013 | Ullman | |
| 8,571,781 B2 | 10/2013 | Bernstein et al. | |
| 8,577,595 B2 | 11/2013 | Zhao et al. | |
| 8,600,600 B2 | 12/2013 | Jung | |
| 8,670,889 B2 | 3/2014 | Kaznov | |
| 8,672,062 B2 | 3/2014 | Schroll et al. | |
| 8,751,063 B2 | 6/2014 | Bernstein et al. | |
| 8,766,983 B2 | 7/2014 | Marks et al. | |
| 8,788,130 B1 | 7/2014 | Tran et al. | |
| 8,805,947 B1 | 8/2014 | Kuzkin | |
| 8,838,273 B2 | 9/2014 | Hvass et al. | |
| 8,862,301 B2 | 10/2014 | Araki et al. | |
| 8,882,559 B2 | 11/2014 | Fessenmaier | |
| 8,885,882 B1 | 11/2014 | Yin et al. | |
| 9,011,197 B2 | 4/2015 | Smoot et al. | |
| 9,014,848 B2 | 4/2015 | Farlow et al. | |
| 9,041,622 B2 | 5/2015 | McCulloch | |
| 9,090,214 B2 | 7/2015 | Bernstein et al. | |
| 9,114,838 B2 | 8/2015 | Bernstein et al. | |
| 9,150,263 B2 | 10/2015 | Bernstein et al. | |
| 9,193,404 B2 | 11/2015 | Bernstein et al. | |
| 9,211,920 B1 | 12/2015 | Bernstein et al. | |
| 9,218,316 B2 | 12/2015 | Bernstein et al. | |
| 9,280,717 B2 | 3/2016 | Polo et al. | |
| 9,290,220 B2 | 3/2016 | Bernstein et al. | |
| 9,292,758 B2 | 3/2016 | Polo et al. | |
| 9,389,612 B2 | 7/2016 | Bernstein et al. | |

(56) References Cited

U.S. PATENT DOCUMENTS

| | | | |
|---|---|---|---|
| 9,394,016 B2 | 7/2016 | Bernstein et al. | |
| 9,395,725 B2 | 7/2016 | Berstein et al. | |
| 9,429,940 B2 | 8/2016 | Bernstein et al. | |
| 9,457,730 B2 | 10/2016 | Berstein et al. | |
| 9,481,410 B2 | 11/2016 | Bernstein et al. | |
| 9,483,876 B2 | 11/2016 | Polo et al. | |
| 9,558,612 B2 | 1/2017 | Lyons | |
| 2002/0011368 A1* | 1/2002 | Berg | B60K 7/00 180/218 |
| 2002/0036104 A1 | 3/2002 | Kerrebrock et al. | |
| 2002/0142701 A1 | 10/2002 | Rosenberg | |
| 2003/0093182 A1 | 5/2003 | Yokoyama | |
| 2003/0118217 A1 | 6/2003 | Kondo et al. | |
| 2003/0179176 A1 | 9/2003 | Waterston | |
| 2003/0216834 A1 | 11/2003 | Allard | |
| 2003/0216835 A1 | 11/2003 | Wakui | |
| 2004/0002843 A1 | 1/2004 | Robarts et al. | |
| 2004/0015266 A1* | 1/2004 | Skoog | B25J 5/007 700/245 |
| 2004/0168837 A1 | 9/2004 | Michaud et al. | |
| 2004/0182614 A1 | 9/2004 | Wakui | |
| 2004/0186623 A1 | 9/2004 | Dooley et al. | |
| 2004/0192163 A1 | 9/2004 | Siegel | |
| 2004/0198159 A1* | 10/2004 | Xu | A63H 33/26 446/325 |
| 2005/0004723 A1 | 1/2005 | Duggan et al. | |
| 2005/0186884 A1 | 8/2005 | Evans | |
| 2005/0216186 A1 | 9/2005 | Dorfman | |
| 2005/0226192 A1 | 10/2005 | Red et al. | |
| 2005/0264472 A1 | 12/2005 | Rast | |
| 2006/0080802 A1 | 4/2006 | Tani | |
| 2006/0095158 A1 | 5/2006 | Lee et al. | |
| 2006/0101465 A1 | 5/2006 | Kato et al. | |
| 2006/0132318 A1 | 6/2006 | Shimizu | |
| 2006/0241812 A1 | 10/2006 | Juang | |
| 2006/0271251 A1 | 11/2006 | Hopkins | |
| 2007/0034734 A1 | 2/2007 | Yoeli | |
| 2007/0085706 A1 | 4/2007 | Feyereisen et al. | |
| 2007/0112462 A1 | 5/2007 | Kim et al. | |
| 2007/0150103 A1* | 6/2007 | Im | G05D 1/028 700/245 |
| 2007/0162862 A1 | 7/2007 | Ogasawara | |
| 2007/0192910 A1 | 8/2007 | Vu | |
| 2007/0249422 A1 | 10/2007 | Podoloff | |
| 2007/0259592 A1 | 11/2007 | Imai et al. | |
| 2007/0282484 A1 | 12/2007 | Chung et al. | |
| 2008/0009965 A1 | 1/2008 | Bruemmer et al. | |
| 2008/0012518 A1 | 1/2008 | Yamamoto | |
| 2008/0033641 A1 | 2/2008 | Medalia | |
| 2008/0077284 A1 | 3/2008 | Swope | |
| 2008/0082208 A1 | 4/2008 | Hong | |
| 2008/0086241 A1 | 4/2008 | Phillips et al. | |
| 2008/0121097 A1 | 5/2008 | Rudakevych et al. | |
| 2008/0174268 A1 | 7/2008 | Koo et al. | |
| 2008/0174448 A1 | 7/2008 | Hudson | |
| 2008/0182479 A1 | 7/2008 | Elliott et al. | |
| 2008/0240507 A1 | 10/2008 | Niwa et al. | |
| 2008/0263628 A1 | 10/2008 | Norman et al. | |
| 2008/0267450 A1 | 10/2008 | Sugimoto et al. | |
| 2008/0269949 A1 | 10/2008 | Norman et al. | |
| 2009/0018712 A1 | 1/2009 | Duncan | |
| 2009/0028439 A1 | 1/2009 | Elangovan et al. | |
| 2009/0033623 A1 | 2/2009 | Lin | |
| 2009/0055019 A1 | 2/2009 | Stiehl et al. | |
| 2009/0057238 A1 | 3/2009 | Garti | |
| 2009/0069084 A1 | 3/2009 | Reece | |
| 2009/0073034 A1 | 3/2009 | Linsky et al. | |
| 2009/0078484 A1 | 3/2009 | Kocijan | |
| 2009/0081923 A1 | 3/2009 | Dooley et al. | |
| 2009/0133467 A1 | 5/2009 | Mori et al. | |
| 2009/0138232 A1 | 5/2009 | Fuwa | |
| 2009/0153349 A1 | 6/2009 | Lin | |
| 2009/0157221 A1 | 6/2009 | Sip | |
| 2009/0161983 A1 | 6/2009 | Ciurea | |
| 2009/0164638 A1 | 6/2009 | Jang | |
| 2009/0171516 A1 | 7/2009 | Reich | |
| 2009/0187299 A1 | 7/2009 | Fregene | |
| 2009/0198371 A1 | 8/2009 | Emanuel et al. | |
| 2009/0204261 A1 | 8/2009 | Strand et al. | |
| 2009/0222148 A1 | 9/2009 | Knotts et al. | |
| 2009/0226035 A1 | 9/2009 | Iihoshi et al. | |
| 2009/0245656 A1 | 10/2009 | Hu | |
| 2009/0256822 A1 | 10/2009 | Amireh et al. | |
| 2009/0262074 A1 | 10/2009 | Nasiri et al. | |
| 2009/0265671 A1 | 10/2009 | Sachs et al. | |
| 2009/0278932 A1 | 11/2009 | Yi | |
| 2009/0284553 A1 | 11/2009 | Seydoux | |
| 2009/0316012 A1 | 12/2009 | Matos | |
| 2010/0002909 A1 | 1/2010 | Lefevre et al. | |
| 2010/0004798 A1 | 1/2010 | Bodin et al. | |
| 2010/0010669 A1 | 1/2010 | Lee et al. | |
| 2010/0010672 A1 | 1/2010 | Wang et al. | |
| 2010/0032224 A1 | 2/2010 | Liu | |
| 2010/0063652 A1 | 3/2010 | Anderson | |
| 2010/0066676 A1 | 3/2010 | Kramer et al. | |
| 2010/0084513 A1 | 4/2010 | Gariepy et al. | |
| 2010/0090661 A1 | 4/2010 | Chen et al. | |
| 2010/0106344 A1 | 4/2010 | Edwards et al. | |
| 2010/0145236 A1 | 6/2010 | Greenberg et al. | |
| 2010/0169098 A1 | 7/2010 | Patch | |
| 2010/0172287 A1 | 7/2010 | Krieter | |
| 2010/0178982 A1 | 7/2010 | Ehrman | |
| 2010/0183195 A1 | 7/2010 | Sharma | |
| 2010/0234993 A1 | 9/2010 | Seelinger et al. | |
| 2010/0241289 A1 | 9/2010 | Sandberg | |
| 2010/0261526 A1 | 10/2010 | Anderson et al. | |
| 2010/0264756 A1 | 10/2010 | Lee et al. | |
| 2010/0283988 A1 | 11/2010 | Mosier et al. | |
| 2010/0302247 A1 | 12/2010 | Perez et al. | |
| 2010/0302359 A1 | 12/2010 | Adams | |
| 2010/0305778 A1 | 12/2010 | Dorneich et al. | |
| 2010/0305781 A1 | 12/2010 | Felix | |
| 2010/0312917 A1 | 12/2010 | Allport | |
| 2010/0324753 A1 | 12/2010 | Okumatsu | |
| 2011/0003640 A9 | 1/2011 | Ehrman | |
| 2011/0018731 A1 | 1/2011 | Linsky et al. | |
| 2011/0018794 A1 | 1/2011 | Linsky et al. | |
| 2011/0022196 A1 | 1/2011 | Linsky et al. | |
| 2011/0035054 A1 | 2/2011 | Gal et al. | |
| 2011/0050940 A1 | 3/2011 | Lanz et al. | |
| 2011/0060492 A1 | 3/2011 | Kaznov | |
| 2011/0065488 A1 | 3/2011 | Okamura et al. | |
| 2011/0071652 A1 | 3/2011 | Brown et al. | |
| 2011/0071702 A1 | 3/2011 | Wang et al. | |
| 2011/0082566 A1 | 4/2011 | Herr et al. | |
| 2011/0087371 A1 | 4/2011 | Sandberg et al. | |
| 2011/0138416 A1 | 6/2011 | Kang et al. | |
| 2011/0153885 A1 | 6/2011 | Mak et al. | |
| 2011/0156943 A1 | 6/2011 | Wong et al. | |
| 2011/0174565 A1* | 7/2011 | Rochat | B62D 57/024 180/167 |
| 2011/0183732 A1 | 7/2011 | Block et al. | |
| 2011/0184590 A1 | 7/2011 | Duggan et al. | |
| 2011/0201362 A1 | 8/2011 | Bregman-Amitai et al. | |
| 2011/0132671 A1 | 9/2011 | Lee et al. | |
| 2011/0213278 A1 | 9/2011 | Horak et al. | |
| 2011/0231013 A1 | 9/2011 | Smoot et al. | |
| 2011/0234488 A1 | 9/2011 | Ge et al. | |
| 2011/0237324 A1 | 9/2011 | Clavin et al. | |
| 2011/0246904 A1 | 10/2011 | Pinto | |
| 2011/0250967 A1 | 10/2011 | Kulas | |
| 2011/0249074 A1 | 11/2011 | Cranfill | |
| 2011/0273379 A1 | 11/2011 | Chen et al. | |
| 2011/0283223 A1 | 11/2011 | Vaittinen et al. | |
| 2011/0285349 A1 | 11/2011 | Widmer et al. | |
| 2011/0286631 A1 | 11/2011 | Wagner et al. | |
| 2011/0291926 A1 | 12/2011 | Gokturk et al. | |
| 2011/0304633 A1 | 12/2011 | Beardsley | |
| 2011/0308873 A1 | 12/2011 | Kim et al. | |
| 2011/0313568 A1 | 12/2011 | Blackwell et al. | |
| 2011/0320830 A1 | 12/2011 | Ito | |
| 2012/0009845 A1 | 1/2012 | Schmelzer | |
| 2012/0035799 A1 | 2/2012 | Ehrmann | |
| 2012/0043149 A1 | 2/2012 | Kim et al. | |

(56) References Cited

U.S. PATENT DOCUMENTS

| | | |
|---|---|---|
| 2012/0043172 A1 | 2/2012 | Ichikawa |
| 2012/0059520 A1 | 3/2012 | Kossett |
| 2012/0065747 A1 | 3/2012 | Brown et al. |
| 2012/0072023 A1 | 3/2012 | Ota |
| 2012/0083945 A1 | 4/2012 | Oakley et al. |
| 2012/0083962 A1 | 4/2012 | Sato et al. |
| 2012/0099756 A1 | 4/2012 | Sherman et al. |
| 2012/0100915 A1 | 4/2012 | Margalit et al. |
| 2012/0106783 A1 | 5/2012 | Chang et al. |
| 2012/0112553 A1 | 5/2012 | Stoner |
| 2012/0129605 A1 | 5/2012 | Livet |
| 2012/0146775 A1 | 6/2012 | Kudo et al. |
| 2012/0149359 A1 | 6/2012 | Huang |
| 2012/0167014 A1 | 6/2012 | Joo et al. |
| 2012/0168240 A1* | 7/2012 | Wilson ............ A63H 30/04 180/167 |
| 2012/0173018 A1 | 7/2012 | Allen et al. |
| 2012/0173047 A1 | 7/2012 | Bernstein et al. |
| 2012/0173050 A1 | 7/2012 | Bernstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0200380 A1 | 8/2012 | Kocijan |
| 2012/0215355 A1 | 8/2012 | Bewley et al. |
| 2012/0229647 A1 | 9/2012 | Calman et al. |
| 2012/0232977 A1 | 9/2012 | Calman et al. |
| 2012/0233015 A1 | 9/2012 | Calman et al. |
| 2012/0240077 A1 | 9/2012 | Vaittinen et al. |
| 2012/0244969 A1 | 9/2012 | Binder |
| 2012/0258645 A1 | 10/2012 | Cheng |
| 2012/0262002 A1 | 10/2012 | Widmer et al. |
| 2012/0263154 A1 | 10/2012 | Blanchflower et al. |
| 2012/0291926 A1 | 11/2012 | Misra et al. |
| 2012/0293548 A1 | 11/2012 | Perez et al. |
| 2012/0298049 A1 | 11/2012 | Cook et al. |
| 2012/0298430 A1 | 11/2012 | Schroll et al. |
| 2012/0302129 A1 | 11/2012 | Persaud |
| 2012/0306850 A1 | 12/2012 | Balan et al. |
| 2012/0307001 A1 | 12/2012 | Osako et al. |
| 2012/0309261 A1 | 12/2012 | Boman |
| 2012/0311810 A1 | 12/2012 | Gilbert et al. |
| 2013/0022274 A1 | 1/2013 | Lawrence |
| 2013/0040533 A1 | 2/2013 | Miller |
| 2013/0050069 A1 | 2/2013 | Ota |
| 2013/0065482 A1 | 3/2013 | Trickett |
| 2013/0105239 A1* | 5/2013 | Fung ............ H04N 7/142 180/218 |
| 2013/0109272 A1 | 5/2013 | Rindlisbacher |
| 2013/0113307 A1 | 5/2013 | Kim et al. |
| 2013/0143482 A1 | 6/2013 | Regier |
| 2013/0200207 A1 | 8/2013 | Pongratz |
| 2013/0265225 A1 | 10/2013 | Nasiri et al. |
| 2013/0293584 A1 | 11/2013 | Anderson et al. |
| 2013/0307875 A1 | 11/2013 | Anderson et al. |
| 2014/0008496 A1 | 1/2014 | Ye |
| 2014/0015493 A1 | 1/2014 | Wirz et al. |
| 2014/0051513 A1 | 2/2014 | Polo et al. |
| 2014/0120887 A1 | 5/2014 | Huang |
| 2014/0207280 A1 | 7/2014 | Duffley |
| 2014/0238762 A1 | 8/2014 | Berberian et al. |
| 2014/0249697 A1 | 9/2014 | Fredriksson |
| 2014/0371954 A1 | 12/2014 | Lee et al. |
| 2015/0091697 A1 | 4/2015 | Takayasu |
| 2015/0209664 A1 | 7/2015 | Haseltine |
| 2015/0268666 A1 | 9/2015 | Wang et al. |
| 2016/0033967 A1 | 2/2016 | Bernstein et al. |
| 2016/0054734 A1 | 2/2016 | Bernstein et al. |
| 2016/0090133 A1 | 3/2016 | Bernstein et al. |
| 2016/0148367 A1 | 5/2016 | Polo et al. |
| 2016/0202696 A1 | 7/2016 | Bernstein et al. |
| 2016/0246299 A1 | 8/2016 | Berberian et al. |
| 2016/0282871 A1 | 9/2016 | Berstein et al. |
| 2016/0291591 A1 | 10/2016 | Bernstein et al. |
| 2016/0291595 A1 | 10/2016 | Halloran |
| 2016/0349748 A1 | 12/2016 | Bernstein et al. |
| 2017/0080352 A1 | 3/2017 | Bernstein et al. |
| 2017/0092009 A1 | 3/2017 | Polo et al. |

FOREIGN PATENT DOCUMENTS

| | | |
|---|---|---|
| CN | 1765595 | 5/2006 |
| CN | 101154110 | 4/2008 |
| CN | 201147642 | 11/2008 |
| CN | 20120111 | 4/2009 |
| CN | 101426664 | 5/2009 |
| CN | 102421629 | 4/2012 |
| DE | 19809168 | 9/1999 |
| DE | 101 46 862 A1 | 5/2002 |
| DE | 102011108689 | 4/2012 |
| EP | 1944573 | 7/2008 |
| EP | 102010042395 | 4/2012 |
| GB | 2309650 | 8/1997 |
| GB | 2319756 | 6/1998 |
| JP | 03182290 A | 8/1991 |
| JP | H07-308462 | 11/1995 |
| JP | 09254838 A | 9/1997 |
| JP | 2000218578 A | 8/2000 |
| JP | 2001153650 | 6/2001 |
| JP | 2002345706 | 12/2002 |
| JP | 2004042246 | 2/2004 |
| JP | 2004148439 | 5/2004 |
| JP | 2004260917 | 9/2004 |
| JP | 2007072802 | 3/2007 |
| JP | 2007213353 | 8/2007 |
| JP | 2008-040725 A | 2/2008 |
| JP | 2011530756 | 12/2011 |
| JP | 2012022457 | 2/2012 |
| JP | 4893862 | 3/2012 |
| KR | 10-2008-0073626 A | 8/2008 |
| KR | 10-2009-0000013 A | 1/2009 |
| KR | 20100001408 | 1/2010 |
| KR | 10-2008-0092595 A | 7/2010 |
| KR | 10-0969873 B1 | 7/2010 |
| KR | 10-2008-040725 A | 5/2011 |
| TW | 20105393 | 4/2010 |
| WO | WO-97/25239 A1 | 7/1991 |
| WO | WO-2006/049559 A1 | 5/2006 |
| WO | WO-2012/094349 A2 | 7/2012 |
| WO | 2012103525 | 8/2012 |

OTHER PUBLICATIONS

European Search Report and European Search Opinion mailed Nov. 6, 2014, for related EP Application No. 12731945.7 filed Jul. 26, 2013. 7 pages.

Liu, Dalian et al., "Motion Control of a Spherical Mobile Robot by Feedback Linearization," 7th WC on IC&A, Jun. 27, 2008, Chongqing, China, pp. 965-970. 6 pages.

Shu, Guanghui et al., "Motion Control of Spherical Robot Based on Conservation of Angular Momentum," IEEE Intl Conf on Mechatronics & Automation, Aug. 12, Changchun, China, pp. 599-604. 6 pages.

Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.

Harmo, Panu et al., "Moving Eye—Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.

Halme, Aarne, et al., "Motion Control of a Spherical Mobile Robot", Helsinki, IEEE AMC '1996, pp. 259-264. 6 pages.

Non-Final Office Action mailed Apr. 29, 2013, for related U.S. Appl. No. 13/342,874, filed Jan. 3, 2012, 47 pages.

Final Office Action mailed Jun. 6, 2014, for related U.S. Appl. No. 13/342,908, filed Jan. 3, 2012, 32 pages.

U.S. Appl. No. 61/362,005, Schmelzer, effective filed Jul. 7, 2010, 10 pages.

Non-Final Office Action mailed Oct. 16, 2012, for related U.S. Appl. No. 13/342,853, filed Feb. 19, 2013, 10 pages.

(56) References Cited

OTHER PUBLICATIONS

Non-Final Office Action mailed Apr. 9, 2013, for related U.S. Appl. No. 13/342,892, filed Jan. 3, 2013, 19 pages.
Notification of Transmittal of International Search Report and The Written Opinion of the International Searching Authority mailed Dec. 3, 2012, for related PCT Application No. PCT/US2012/020115 filed Jan. 3, 2012, 11 pages.
Non-Final Office Action mailed Apr. 16, 2013, for related U.S. Appl. No. 13/342,884, filed Jan. 3, 2013, 20 pages.
Notice of Allowance mailed Apr. 19, 2013, for related U.S. Appl. No. 13/342,853, filed Feb. 19, 2013, 11 pages.
Non-Final Office Action mailed May 13, 2013, for related U.S. Appl. No. 13/342,874, filed Jan. 3, 2012, 17 pages.
Non-Final Office Action mailed Jun. 3, 2013, for related U.S. Appl. No. 13/342,914, filed Jan. 3, 2012, 32 pages.
Koshiyama et al., Machine Translation for JP 2000-218578, Aug. 8, 2000, 11 Pages.
Non-Final Office Action mailed Jun. 13, 2013, for related U.S. Appl. No. 13/342,908, filed Jan. 3, 2012, 36 pages.
GearBox Ball Prototype Jun. 29, 2010, Pictures from Video [online]. Orbotix, Inc., Jun. 30, 2010, 91 pages. Retrieved from the internet<URL: http://www.youtube.com/watch?v=qRBM7bAaXpU>.
Notification of Transmittal of International Search Report and the Written Opinion of the International Searching Authority mailed Aug. 28, 2013, for related PCT Application No. PCT/US2013/041023 filed May 14, 2013, 11 pages.
Final Office Action mailed Nov. 15, 2013, for related U.S. Appl. No. 13/342,892, filed Jan. 3, 2013, 21 pages.
Final Office Action mailed Nov. 18, 2013, for related U.S. Appl. No. 13/342,884, filed Jan. 3, 2013, 19 pages.
Final Office Action mailed Nov. 18, 2013, for related U.S. Appl. No. 13/342,874, filed Jan. 3, 2012, 21 pages.
Final Office Action mailed Nov. 13, 2013, for related U.S. Appl. No. 13/342,914, filed Jan. 3, 2012, 30 pages.
Non-Final Office Action mailed Dec. 20, 2013, for related U.S. Appl. No. 13/342,908, filed Jan. 3, 2012, 28 pages.
Notification of Transmittal of International Search Report and The Written Opinion of the International Searching Authority mailed Aug. 26, 2014, for related PCT Application No. PCT/US2014/037013 filed May 6, 2014, 10 pages.
International Search Report and the Written Opinion of The International Searching Authority mailed Mar. 2, 2015, for related PCT Application No. PCT/US2014/068606 filed Dec. 4, 2014, 9 pages.
European Search Report in Application 13790911.5, dated Oct. 14, 2016, 10 pages.
Loy et al., "Fast Radial Symmetry for Detecing Points of Interest", IEEE Transactions on Pattern Analysis and Machine Intelligence, IEEE Computer Society, USA, vol. 25, No. 8, Aug. 1, 2003, 15 pages.
European Search Report in Application 14795148.7, dated Dec. 7, 2016, 7 pages.
"Roll, Pitch, and Yaw, How Things Fly", How Things Fly website, https://howthingsfly.si.edu/flight-dynamics/roll-pitch-and-yaw.
Airioiu, "Force Feedback Stabilization for Remote Control of an Assistive Mobile Robot", AACC Publication, 2011, pp. 4898-4903.
Chinese Office Action in Application 201380036857.2, dated Jun. 29, 2016, 10 pages.
Chinese Office Action in Application 201620300686, dated Sep. 9, 2016, 3 pages.
Diolaiti et al., "Tele-operation of a Mobile Robot Through Haptic Feedback", IEEE, 2002, pp. 1-6.
European Search Report in Application 13817382.2, dated Mar. 11, 2016, 8 pages.
Hashimoto et al., "TouchMe: An Augmented Reality Based Remote Robot Manipulation", 2011-11, pp. 61-66.
Korean Office Action in Application 10-2015-7003642, dated Nov. 28, 2016, 13 pages.
Osorio et al., "Mobile Robots Design and Implementation: From Virtual Simulation to Real Robots", IDME Publication, 2010, 6 pages.
PCT International Search Report in PCT/US2013/050327, dated Oct. 15, 2013, 11 pages.
PCT International Search Report in PCT/US2014/059973, dated Dec. 17, 2014, 11 pages.
PCT International Search Report in PCT/US2015/030877, daetd Aug. 13, 2015, 5 pages.
PCT International Search Report in PCT/US2015/044885, dated Oct. 29, 2015, 7 pages.
Simsarian et al., "Achieving Virtual Presence with a Semi-autonomous Robot through a Multi-reality and speech control interface", 1996, pp. 50-63.
U.S. Appl. No. 13/342,853, Amendment and Response filed Dec. 19, 2013, 7 pages.
U.S. Appl. No. 13/342,853, Notice of Allowance dated Jun. 20, 2013, 6 pages.
U.S. Appl. No. 13/342,874, Amendment and Response filed Sep. 13, 2013, 21 pages.
U.S. Appl. No. 13/342,874, Amendment and Response filed Jan. 21, 2014, 13 pages.
U.S. Appl. No. 13/342,874, Amendment and Response filed Jul. 14, 2014, 13 pages.
U.S. Appl. No. 13/342,874, Amendment and Response filed Mar. 5, 2015, 11 pages.
U.S. Appl. No. 13/342,874, Amendment and Response filed Jul. 7, 2015, 9 pages.
U.S. Appl. No. 13/342,874, Notice of Allowance dated Jul. 24, 2015, 18 pages.
U.S. Appl. No. 13/342,874, Notice of Allowance dated Aug. 11, 2015, 3 pages.
U.S. Appl. No. 13/342,874, Office Action dated Sep. 4, 2014, 16 pages.
U.S. Appl. No. 13/342,874, Office Action dated Apr. 7, 2015, 8 pages.
U.S. Appl. No. 13/342,884, Amendment and Response filed Sep. 16, 2013, 32 pages.
U.S. Appl. No. 13/342,884, Amendment and Response filed Jan. 21, 2014, 11 pages.
U.S. Appl. No. 13/342,884, Notice of Allowance dated Feb. 19, 2014, 14 pages.
U.S. Appl. No. 13/342,892, Amendment and Response filed Sep. 9, 2013, 27 pages.
U.S. Appl. No. 13/342,892, Amendment and Response filed Feb.18, 2014, 12 pages.
U.S. Appl. No. 13/342,892, Appeal Brief filed Jul. 17, 2014, 30 pages.
U.S. Appl. No. 13/342,892, Response to Appeal Brief dated Aug. 6, 2014, 16 pages.
U.S. Appl. No. 13/342,908, Advisory Action dated Aug. 11, 2014, 3 pages.
U.S. Appl. No. 13/342,908, Advisory Action dated Sep. 18, 2014, 4 pages.
U.S. Appl. No. 13/342,908, Amendment and Response filed Oct. 15, 2013, 32 pages.
U.S. Appl. No. 13/342,908, Amendment and Response filed Mar. 20, 2014, 21 pages.
U.S. Appl. No. 13/342,908, Amendment and Response filed Aug. 4, 2014, 13 pages.
U.S. Appl. No. 13/342,908, Amendment and Response filed Sep. 5, 2014, 18 pages.
U.S. Appl. No. 13/342,908, Amendment and Response filed Dec. 6, 2015, 12 pages.
U.S. Appl. No. 13/342,908, Notice of Allowance dated Apr. 29, 2015, 12 pages.
U.S. Appl. No. 13/342,908, Supplemental Amendment and Response filed Apr. 17, 2015, 10 pages.
U.S. Appl. No. 13/342,914, Advisory Action dated Feb. 13, 2014, 3 pages.
U.S. Appl. No. 13/342,914, Amendment and Response filed Sep. 3, 2013, 24 pages.

(56) References Cited

OTHER PUBLICATIONS

U.S. Appl. No. 13/342,914, Amendment and Response filed Feb. 3, 2014, 12 pages.
U.S. Appl. No. 13/342,914, Appeal Brief filed Jul. 3, 2014, 27 pages.
U.S. Appl. No. 13/342,914, Response to Appeal Brief dated Jul. 29, 2014, 10 pages.
U.S. Appl. No. 13/549,097, Amendment and Response filed Mar. 24, 2015, 14 pages.
U.S. Appl. No. 13/549,097, Amendment and Response filed Jan. 22, 2016, 16 pages.
U.S. Appl. No. 13/549,097, Office Action dated Dec. 26, 2014, 20 pages.
U.S. Appl. No. 13/549,097, Office Action dated Oct. 22, 2015, 20 pages.
U.S. Appl. No. 13/549,097, Office Action dated Oct. 4, 2016, 22 pages.
U.S. Appl. No. 13/766,455, Amendment and Response filed Jul. 15, 2015, 11 pages.
U.S. Appl. No. 13/766,455, Notice of Allowance dated Aug. 20, 2015, 15 pages.
U.S. Appl. No. 13/766,455, Office Action dated Apr. 15, 2015, 9 pages.
U.S. Appl. No. 13/894,247, Amendment and Response filed Aug. 13, 2015, 9 pages.
U.S. Appl. No. 13/894,247, Notice of Allowance dated Oct. 29, 2015, 7 pages.
U.S. Appl. No. 13/894,247, Office Action dated Jun. 12, 2015, 14 pages.
U.S. Appl. No. 14/035,841 Amendment and Response filed Sep. 14, 2015, 12 pages.
U.S. Appl. No. 14/035,841, Notice of Allowance dated Sep. 25, 2015, 5 pages.
U.S. Appl. No. 14/035,841, Notice of Allowance dated Oct. 7, 2016, 2 pages.
U.S. Appl. No. 14/035,841, Notice of Allowance dated Oct. 16, 2016, 2 pages.
U.S. Appl. No. 14/035,841, Office Action dated May 14, 2015, 12 pages.
U.S. Appl. No. 14/054,636, Amendment and Response filed Mar. 17, 2016, 13 pages.
U.S. Appl. No. 14/054,636, Amendment and Response filed Sep. 23, 2016, 14 pages.
U.S. Appl. No. 14/054,636, Notice of Allowance dated Dec. 21, 2016, 8 pages.
U.S. Appl. No. 14/054,636, Office Action dated Jan. 20, 2016, 14 pages.
U.S. Appl. No. 14/054,636, Office Action dated Jun. 24, 2016, 23 pages.
U.S. Appl. No. 14/148,541, Amendment and Response filed Sep. 4, 2015, 14 pages.
U.S. Appl. No. 14/148,541, Notice of Allowance dated Nov. 18, 2015, 11 pages.
U.S. Appl. No. 14/148,541, Office Action dated Jun. 4, 2015, 18 pages.
U.S. Appl. No. 14/261,288, Amendment and Response filed Nov. 5, 2015, 12 pages.
U.S. Appl. No. 14/261,288, Notice of Allowance dated Nov. 23, 2015, 10 pages.
U.S. Appl. No. 14/261,288, Office Action dated Jul. 7, 2015, 13 pages.
U.S. Appl. No. 14/271,203, Advisory Action dated Mar. 2, 2016, 3 pages.
U.S. Appl. No. 14/271,203, Amendment and Response filed Oct. 26, 2015, 10 pages.
U.S. Appl. No. 14/271,203, Amendment and Response filed Feb. 23, 2016, 9 pages.
U.S. Appl. No. 14/271,203, Amendment and Response filed Mar. 11, 2016, 9 pages.
U.S. Appl. No. 14/271,203, Amendment and Response filed Jun. 6, 2016, 9 pages.
U.S. Appl. No. 14/271,203, Office Action dated Jul. 27, 2015, 11 pages.
U.S. Appl. No. 14/271,203, Office Action dated Dec. 21, 2015, 10 pages.
U.S. Appl. No. 14/271,203, Office Action dated Apr. 4, 2016, 10 pages.
U.S. Appl. No. 14/271,203, Office Action dated Aug. 1, 2016, 17 pages.
U.S. Appl. No. 14/459,235, Notice of Allowance dated Mar. 6, 2015, 9 pages.
U.S. Appl. No. 14/459,235, Notice of Allowance dated Jun. 25, 2015, 7 pages.
U.S. Appl. No. 14/663,446, Notice of Allowance dated Sep. 25, 2015, 9 pages.
U.S. Appl. No. 14/691,349, Amendment and Response filed Aug. 28, 2015, 11 pages.
U.S. Appl. No. 14/691,349, Amendment and Response filed Jan. 26, 2016, 6 pages.
U.S. Appl. No. 14/691,349, Notice of Allowance dated Mar. 4, 2016, 5 pages.
U.S. Appl. No. 14/691,349, Notice of Allowance dated Jun. 6, 2016, 5 pages.
U.S. Appl. No. 14/691,349, Office Action dated Jul. 17, 2015, 9 pages.
U.S. Appl. No. 14/832,801, Amendment and Response filed Feb. 5, 2016, 10 pages.
U.S. Appl. No. 14/832,801, Amendment and Response filed Feb. 12, 2016, 8 pages.
U.S. Appl. No. 14/832,801, Notice of Allowance dated Mar. 22, 2016, 10 pages.
U.S. Appl. No. 14/832,801, Notice of Allowance dated May 11, 2016, 5 pages.
U.S. Appl. No. 14/832,801, Office Action dated Nov. 6, 2015, 6 pages.
U.S. Appl. No. 14/839,610, Amendment and Response filed Feb. 18, 2016, 11 pages.
U.S. Appl. No. 14/839,610, Notice of Allowance dated Mar. 23, 2016, 16 pages.
U.S. Appl. No. 14/839,610, Office Action dated Nov. 18, 2015, 7 pages.
U.S. Appl. No. 14/850,910, Amendment and Response filed Feb. 18, 2016, 7 pages.
U.S. Appl. No. 14/850,910, Notice of Allowance dated Mar. 17, 2016, 11 pages.
U.S. Appl. No. 14/850,910, Office Action dated Nov. 25, 2015, 8 pages.
U.S. Appl. No. 14/968,594, Amendment and Response filed Apr. 5, 2016, 7 pages.
U.S. Appl. No. 14/968,594, Notice of Allowance dated Jul. 19, 2016, 6 pages.
U.S. Appl. No. 14/968,594, Office Action dated Feb. 3, 2016, 5 pages.
U.S. Appl. No. 14/975,510, Amendment and Response filed May 12, 2016, 8 pages.
U.S. Appl. No. 14/975,510, Notice of Allowance dated Jul. 7, 2016, 5 pages.
U.S. Appl. No. 14/975,510, Office Action dated Feb. 12, 2016, 6 pages.
U.S. Appl. No. 15/017,211, Notice of Allowance dated Jul. 5, 2016, 10 pages.
U.S. Appl. No. 15/017,211, Notice of Allowance dated Aug. 8, 2016, 4 pages.
U.S. Appl. No. 15/232,490, Office Action dated Sep. 23, 2016, 5 pages.
Airplane Flying Handbook (FAA-H-8083-3B) Chapter 10, Figure, 10-2, https://www.faa.gov/regulations_policies/handbooks_manuals/aviation/airplane_handbook/media/12_afh_ch10.pdf, 10 pages, 2004, 10 pages.
Chinese Office Action in Application 201380036857.2, dated Mar. 22, 2017, 11 pages.

(56) References Cited

OTHER PUBLICATIONS

Chinese Office Action in Application 201620300686.0, dated Feb. 3, 2016, 5 pages.
Chinese Office Action in Application 201702030180700, dated Feb. 7, 2017, 8 pages.
Curriculum of Dr. Jason Janet cited in IPR2017-01272, filed Apr. 20, 2017, 6 pages.
Declaration of Dr. Jason Janet cited in IPR2017-01272, filed Apr. 20, 2017, 79 pages.
European Extended Search Report in Application 14795148.7, dated Apr. 5, 2017, 12 pages.
Gene F. Franklin, J. David Powell, Abbas Emami-Naeini, Feedback Control of Dynamic Systems, Fourth Edition, Prentice Hall, 2002, 28 pages.
Hashem Ghariblu and Hadi Mohammadi, Structure and Dynamic Modeling of a Spherical Robot, 8th International Symposium an Mechatronics and its Applications, 2012, 5 pages.
Hiroyuki Fujita, A Decade of MEMS and its Future, Proceedings IEEE The Tenth Annual International Workshop on Micro Electra Mechanical Systems, 1997, 8 pages.
How a Small Robotics Startup Helped Disney Bring BB-8 to Life, US Chamber of Commerce (https://www.uschamber.com/above-thefold/how-small-robatics-startup-helped-disney-bring-bb-8-life), Retrieved on Mar. 31, 2017, 6 pages.
Japanese Office Action in Application 2015-512768, dated Dec. 6, 2016, 9 pages.
Japanese Office Action in Application 2015-521853, dated Feb. 14, 2017, 6 pages.
Korean Office Action in Application 10-2014-7034020, dated Dec. 23, 2016, 11 pages.
Marlyn Williams, Sony unwraps high-tech 'healing' ball, CNN.com, published Mar. 28, 2002, http://edition.cnn.com/2002/TECH/ptech/03/28/robodex.healing.ball.idg/?related, retreived on Apr. 4, 2017, 1 page.
Masato Ishikawa, Ryohei Kitayoshi, and Toshiharu Sugie, Dynamic rolling locomotion by spherical mobile robots considering its generalized momentum, Proceedings of SICE Annual Conference 2010 2311 (2010), 6 pages.
Meet BB-8: The New Droid in the Lives of Star Wars Buffs, Wharton School of the University of Pennsylvania (Nov. 13, 2015)(http://knowledge.wharton.upenn.edu/article/meet-bb-8-the-newdroid-in-the-lives-of-star-wars-buffs/), Retrieved on Mar. 31, 2017, 3 pages.
PCT International Preliminary Report on Patentability in PCT/US2015/030877, dated Feb. 23, 2017, 5 pages.
PCT International Preliminary Report on Patentability in PCT/US2015/044885, dated Feb. 23, 2017, 5 pages.
Diang Zhan, Yao Cai, and Caixia Yan, Design, Analysis and Experiments of an Omni-Directional Spherical Robot, IEEE International Conference on Robotics and Automation 4921, 2011, 6 pages.
Randall Munroe, New Pet, http://xkcd.com/413/, Retrieved from Internet Archive (http://web.archive.org/web/20080701080435/http://xkcd.com/413/) (2008), Retrieved on Apr. 13, 2017, 3 pages.
U.S. Appl. No. 13/342,914, Decision on Appeal dated Feb. 1, 2017, 8 pages.
U.S. Appl. No. 13/549,097, Amendment and Response filed Mar. 14, 2017, 13 pages.
U.S. Appl. No. 14/054,636, Notice of Allowance dated Mar. 1, 2017, 7 pages.
U.S. Appl. No. 14/271,203, Amendment and Response filed Feb. 1, 2017, 12 pages.
U.S. Appl. No. 14/271,203, Office Action dated Feb. 21, 2017, 12 pages.
U.S. Appl. No. 14/884,632, Amendment and Response filed Apr. 19, 2017, 3 pages.
U.S. Appl. No. 14/884,632, Office Action dated Jan. 25, 2017, 7 pages.
U.S. Appl. No. 14/933,827, Office Action dated Apr. 21, 2017, 7 pages.
U.S. Appl. No. 15/040,331, Office Action dated Apr. 13, 2017, 10 pages.
U.S. Appl. No. 15/232,490, Amendment and Response filed Feb. 22, 2017, 3 pages.
U.S. Appl. No. 15/232,490, Office Action dated Mar. 17, 2017, 4 pages.
Xialing Lv and Minglu Zhang, Robot Control Based on Voice Command, IEEE International Conference on Automation and Logistics 2490, 2008, 5 pages.
Chinese Office Action in Application 201620300686, dated May 2, 2017, 2 pages. (No English Translation).
U.S. Appl. No. 15/281,478, Office Action dated May 5, 2017, 5 pages.
U.S. Appl. No. 14/884,632, Notice of Allowance dated May 15, 2017, 8 pages.
U.S. Appl. No. 15/146,631, Office Action dated May 16, 2017, 11 pages.
U.S. Appl. No. 13/342,892, Board Decision dated May 5, 2017, 8 pages.
European Office Action in Application 13817383.8, dated Apr. 20, 2017, 6 pages.
U.S. Appl. No. 15/232,490, Amendment and Response filed Jul. 10, 2017, 3 pages.
U.S. Appl. No. 15/040,331, Amendment and Response filed Jul. 10, 2017, 10 pages.
U.S. Appl. No. 14/884,632, Supplemental Notice of Allowance dated Jun. 1, 2017, 2 pages.
U.S. Appl. No. 14/054,636, Notice of Allowance dated Jul. 7, 2017, 7 pages.
U.S. Appl. No. 13/342,892, Notice of Allowance dated Jun. 7, 2017, 7 pages.
U.S. Appl. No. 13/342,892, Supplemental Notice of Allowance dated Jun. 29, 2017, 2 pages.
U.S. Appl. No. 13/549,097, Office Action dated Jun. 26, 2017, 30 pages.
Chinese Office Action in Application 201480029695.4, dated May 27, 2017, 22 pages.
Chinese Office Action in Application 201510463007.1, dated May 31, 2017, 8 pages.
European Extended Search Report in Application 14853882.0, dated Jun. 22, 2017, 6 pages.
Korean Office Action in Application 10-2014-7034020, dated Jun. 30, 2017, 11 pages.
Chinese Notice of Allowance in Application 201380036857.2, dated Aug. 1, 2017, 4 pages.
Chinese Office Action in Application 20150463336.6, dated Jul. 17, 2017, 5 pages. (No English Translation).
Korean Notice of Allowance in Application 10-2015-7003642, dated Jul. 25, 2017, 4 pages.
U.S. Appl. No. 15/232,490, Notice of Allowance dated Sep. 21, 2017, 7 pages.
U.S. Appl. No. 15/146,631, Office Action dated Sep. 21, 2017, 14 pages.
U.S. Appl. No. 13/549,097, Advisory Action dated Sep. 22, 2017, 2 pages.
U.S. Appl. No. 13/342,892, Supplemental Notice of Allowance dated Jul. 26, 2017, 2 pages.
U.S. Appl. No. 13/549,097, Amendment and Response filed Aug. 25, 2017, 11 pages.
U.S. Appl. No. 14/054,636, Supplemental Notice of Allowance dated Aug. 2, 2017, 4 pages.
U.S. Appl. No. 14/271,203, Amendment and Response filed Aug. 18, 2017, 11 pages.
U.S. Appl. No. 14/884,632, Supplemental Notice of Allowance dated Jul. 28, 2017, 2 pages.
U.S. Appl. No. 15/040,331, Notice of Allowance dated Aug. 1, 2017, 9 pages.
U.S. Appl. No. 15/146,631, Amendment and Response filed Aug. 18, 2017, 10 pages.
U.S. Appl. No. 15/177,809, Office Action dated Aug. 16, 2017, 6 pages.
U.S. Appl. No. 15/180,485, Office Action dated Aug. 17, 2017, 9 pages.

(56) References Cited

OTHER PUBLICATIONS

U.S. Appl. No. 15/232,490, Notice of Allowance dated Aug. 10, 2017, 5 pages.
U.S. Appl. No. 15/281,478, Amendment and Response filed Sep. 5, 2017, 8 pages.
Wright's Brothers Propulsion Systems, Smithsonian national Air and Museum, retrieved , retreived Aug. 17, 2017, https://airandspace.si.edu/exhibitions/wright-brothers/online/fly/1903/propulsion.cfm, 5 pages.

* cited by examiner

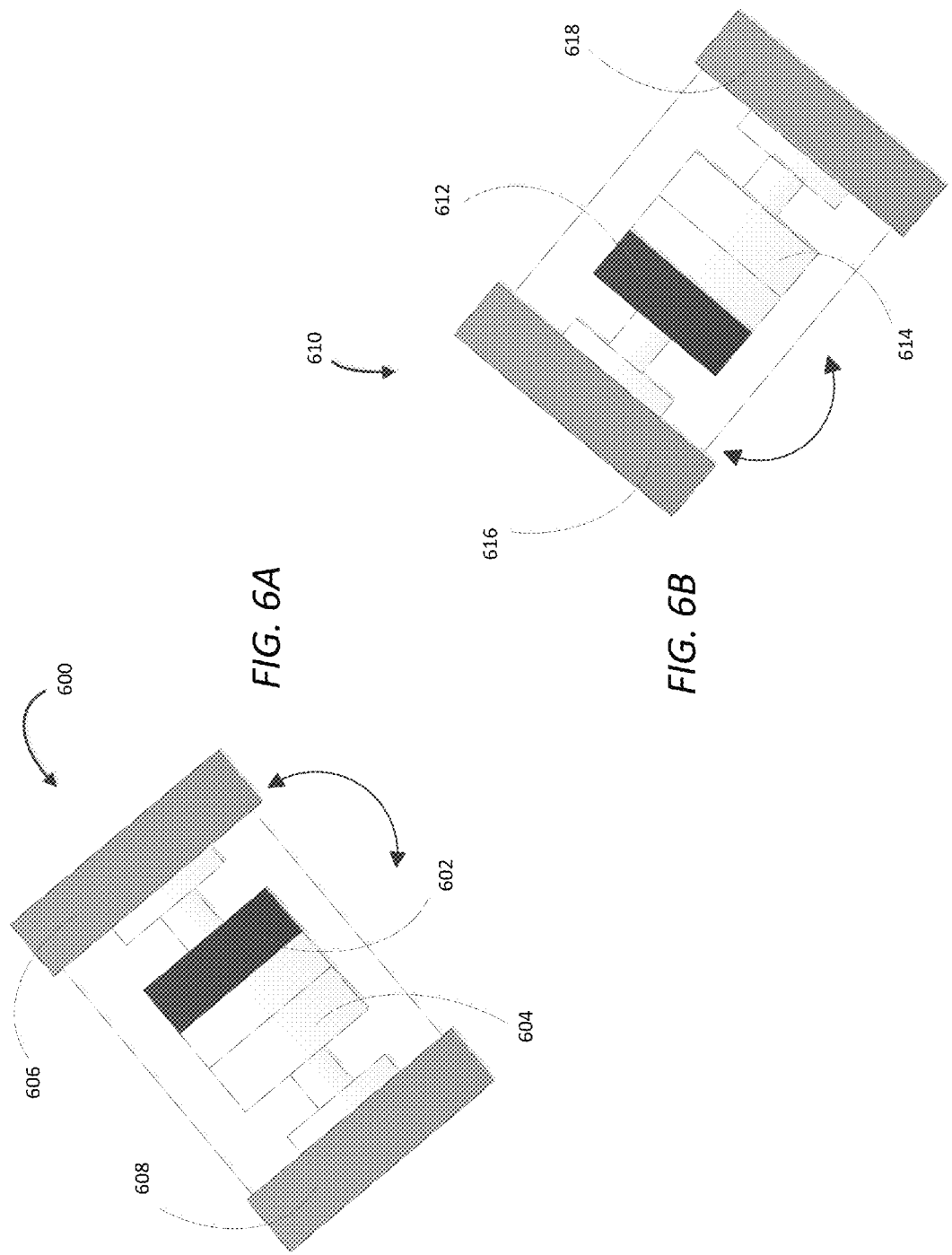

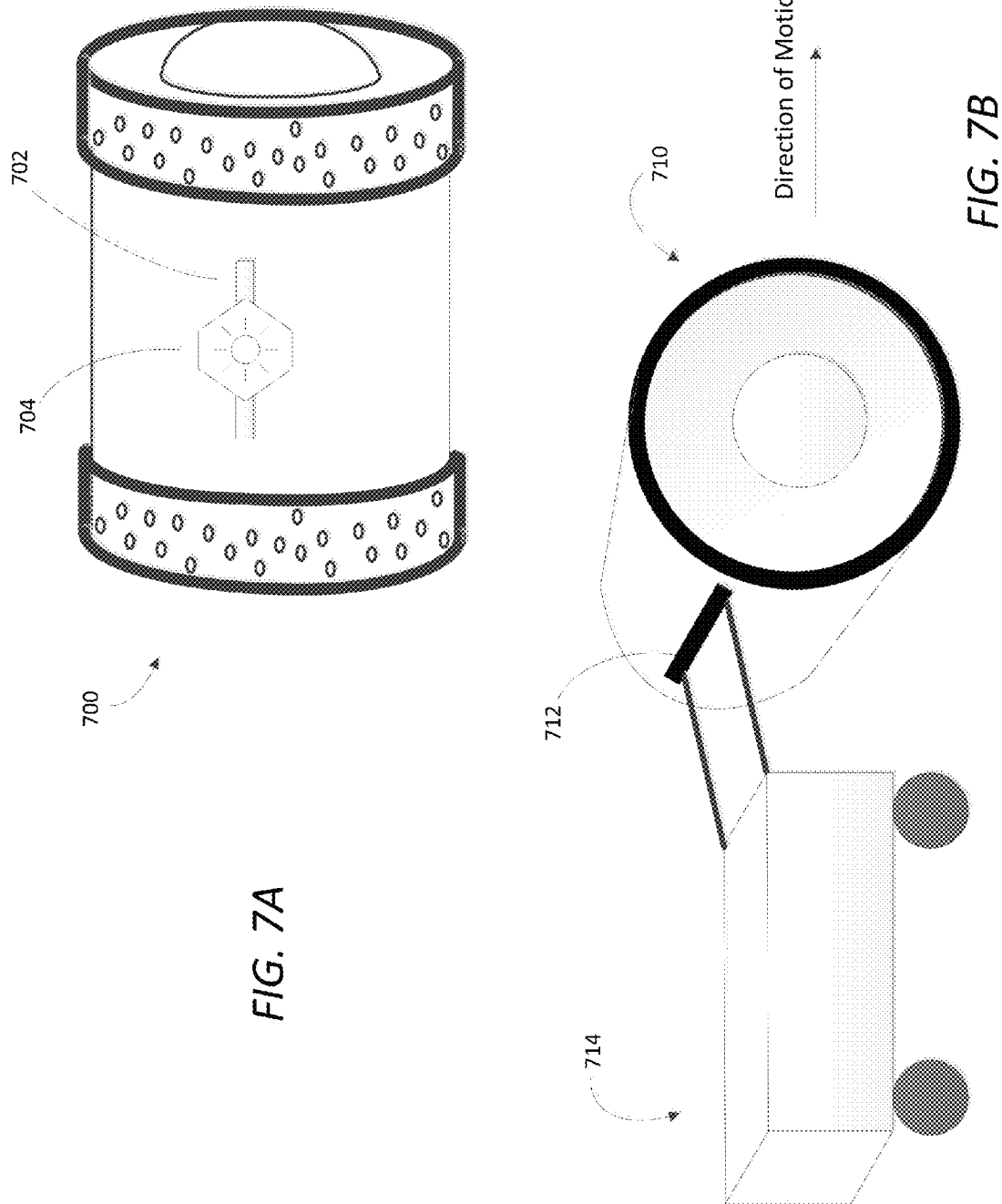

SELF-PROPELLED DEVICE WITH CENTER OF MASS DRIVE SYSTEM

BACKGROUND

Self-propelled devices have previously been powered by inertia or mechanical energy storage in devices such as coiled springs. Remote controlled devices typically use electric motors to engage one or more wheels of the device in order to cause the device to move. As technology has evolved, new methods of propelling and controlling these devices have been implemented.

BRIEF DESCRIPTION OF THE DRAWINGS

The disclosure herein is illustrated by way of example, and not by way of limitation, in the figures of the accompanying drawings and in which like reference numerals refer to similar elements, and in which:

FIGS. 6A and 6B illustrate example mechanisms for causing directional change of the self-propelled device; and FIGS. 7A and 7B illustrate examples of a self-propelled device with attached example accessories.

DETAILED DESCRIPTION

Figure 1:
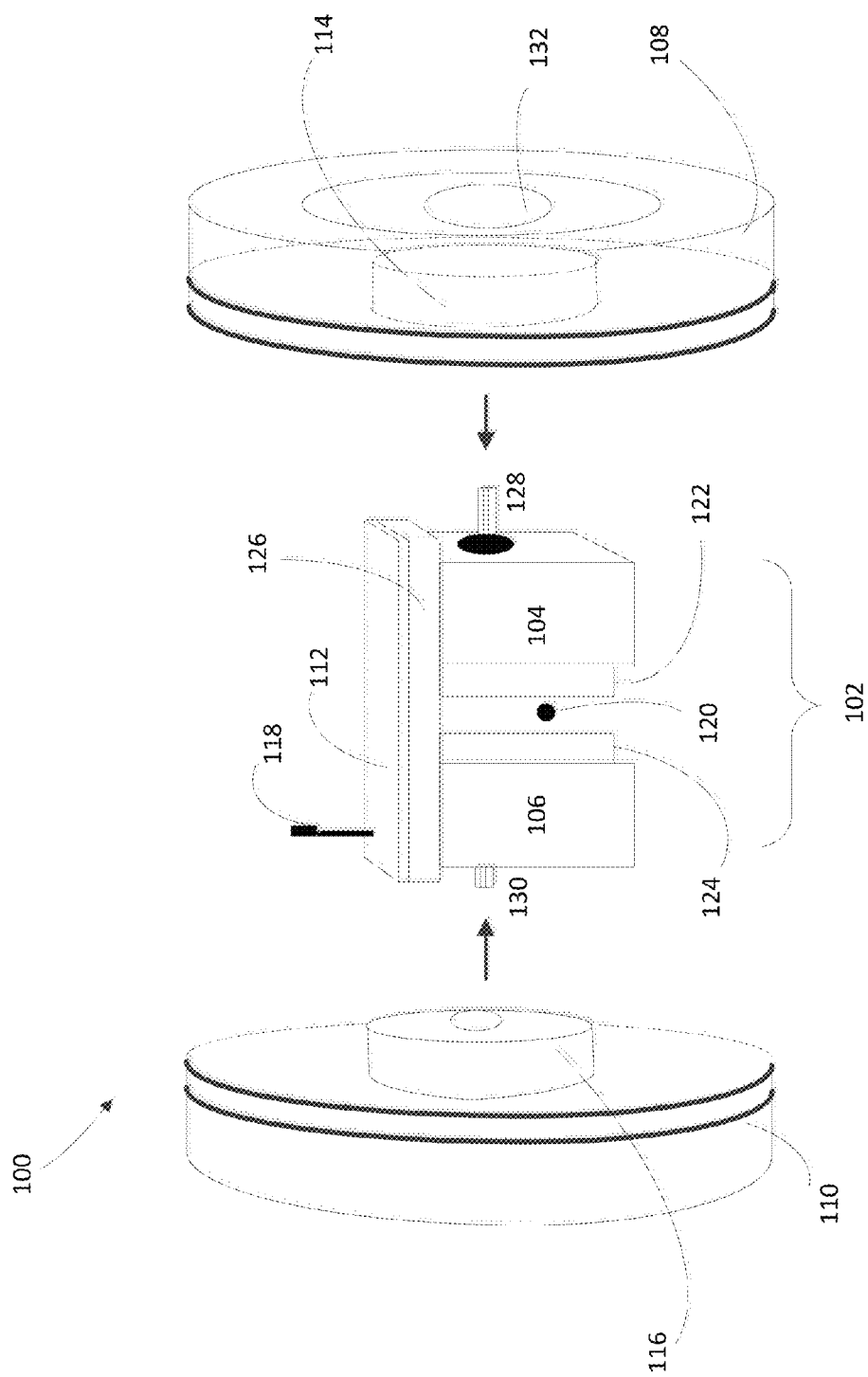
FIG. 1 is a block diagram illustrating interior components of an example tubular self-propelled device.

Examples described herein provide for a cylindrical bodied device that is propelled, at least partially, via displacement of its center of mass. The self-propelled device includes a controllable drive system that can rotate in order to cause the self-propelled device to move. Furthermore, the self-propelled device can be controlled by an external computing device operated by a user. Furthermore, the device can include wheels at either end of the cylindrical body. The wheels have a diameter that is substantially equivalent to the diameter of the cylindrical body. Further still, removable wheel coverings (e.g., tires) and/or removable hub covers may also be included.

Examples also provide a self-propelled device that has a substantially cylindrical body with various components disposed therein that cause the self-propelled device to move. These components include a center of mass drive system contained within the body, a pair of wheels coupled to the drive system and disposed on either end of the self-propelled device, and a pair of motors to independently operate each of the wheels. The motors are powered by one or more power units included in the drive system. Furthermore, the drive system can have a center of mass below a common rotational axis of both of the wheels. Also, the wheels may have a diameter that is substantially equivalent to the diameter of the cylindrical body.

Additionally, the self-propelled device can include a wireless communication port and receiver to receive control inputs from a controller device. The control inputs may be processed by a processor coupled to the wireless communication port to ultimately maneuver the self-propelled device. Further, the processor translates the control inputs to independently operate the left motor and the right motor and/or rotationally pitch the entire drive system so as to displace the center of mass of both the drive system and the self-propelled device in order to cause the self-propelled device to move.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments can be carried and/or executed. In particular, the numerous machines shown with embodiments include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

As used herein, the term "substantially" means at least almost entirely. In quantitative terms, "substantially" may be deemed to be at least 50% of a stated reference (e.g., quantity of size or shape).

FIG. 1 is a block diagram illustrating interior components of an example tube-shaped self-propelled device 100. Central components of the self-propelled device 100 includes a drive system 102 having a pair of adjacent motors 104, 106 each corresponding to a respective wheel 108, 110. Furthermore, each wheel 108, 110 can include an attached gear 114, 116 that couples to a respective motor 104, 106. The self-propelled device further includes a receiver 118 to receive control inputs from an external computing device. The control inputs can be processed by a processor supported on a circuit board 112 which can translate the control inputs into commands to operate the motors 104, 106 either in conjunction and/or independently. One or more of the components of the self-propelled device, such as the motors 104, 106, components of the circuit board 112, and/or the receiver 118, may be powered by one or more power units 122, 124. Components of the circuit board 112 can include one or more memory resources and/or processing means implementing control logic for translating the control inputs received from the external computing device into commands in order to operate the motors 104, 106.

Referring still to FIG. 1, the drive system 102 can be mounted or otherwise attached to a carrier 126. The carrier 126 can include a plurality of mount points upon which components of the self-propelled device 100 may be mounted. As an addition or alternative, select components of the self-propelled device 100 can be bonded or otherwise connected to the carrier 126. As described in detail below, the self-propelled device can also include an external body to be mounted rigidly to the carrier 126 or drive system 102.

The drive system 102 can be comprised of a left motor 104 and a right motor 106. The motors 104, 106 can be standard electric motors or customized electric motors capable of producing any power output. Thus, the scale or size of each of the respective components of the self-propelled device can be modified in order to conform to any desired use. For example, the self-propelled device 100 may include relatively small electric motors for use as a remote controlled vehicle. Alternatively, for example, the self-propelled device may include relatively large motors, such as petroleum powered engines for any variety of industrial or practical uses.

The left motor 104 and the right motor 106 include a respective left axle 128 and a right axle 130. The axles 128, 130 may be toothed or otherwise configured to couple to the gears 114, 116 such that rotational energy of the motors 104, 106 directly causes the wheels 108, 110 and/or the drive system 102 itself to rotate accordingly. Additionally or as an alternative, a mass ratio of the motors 104, 106 with respect to the wheels 108, 110 may be such that when the motors 104, 106 engage the wheels, the entire drive system 102 is rotationally pitched such that a center of mass 120 of the drive system 102 and/or the self-propelled device 100 is displaced so as to cause the self-propelled device 100 to move. Furthermore, the left motor 104 and the right motor 106 are configured to operate independently and in conjunction.

For example, control logic can interpret control inputs from a user of the external computing device instructing the self-propelled device 100 to move linearly in a direction perpendicular to a common rotational axis of both the left wheel 108 and the right wheel 110. The control logic can translate the inputs into commands to operate the motors 104, 106 in conjunction, causing the drive system 102, along with other components of the self-propelled device 100, to rotationally pitch, thereby displacing its center of mass 120 accordingly and causing the self-propelled device 100 to move linearly. For example, rotationally pitching the drive system 102 upwards and forwards causes the center of mass 120 of the entire device to move forward, thus causing the self-propelled device 100 to move linearly. Additionally, the control logic may interpret control inputs instructing the self-propelled device 100 to move in any number of directions perpendicular to a vertical axis of the device 100. Accordingly, the control logic can translate the inputs into commands to operate the motors 104, 106 independently to individually deliver power to each wheel 108, 110 in order to cause the self-propelled device 100 to change direction. Independent and conjunctive operation of the motors 104, 106 can be performed dynamically in response to a user's control inputs on an external computing device.

FIG. 1 further illustrates a structural example of the wheels 108, 110 of the self-propelled device. As an example, the wheels 108, 110 may be formed of any suitable material, such as a composite plastic and/or rubber compound. However, the material used to form the wheels 108, 110 are not limited to any particular compound, but rather can be any cylindrical body which can be configured to be fastened to the drive system 102. The wheels 108, 110 may further be formed with a treaded contact surface to increase grip. Additionally or as an alternative, removable wheel coverings or tires can be fitted over the wheels 108, 110 to further increase grip while the self-propelled device 100 is being maneuvered. Further, the gears 114, 116 can be formed at least partially within an interior surface of each wheel 108, 110 such that the wheel and gear combination may be inserted, and/or fastened to the drive system 102. Alternatively, the gears 114, 116 can be removable from the wheels 108, 110 and provided as separate components of the self-propelled device 100. Each wheel 108, 110 can further include a wheel hub 132 upon which a removable hub cover can be attached, as further described below. The wheel hub 132 is formed within and outer surface of each wheel 108, 110, or the wheel hub 132 can be removable from each wheel 108, 110. Alternatively, the wheels of the self-propelled device can be formed with a hollow inner radius, within which gears and wheel hubs can be fitted or formed. For example, the gear 114 and wheel hub 132 can be combined as a single part to be fitted or formed within the inner radius of the wheel 108.

The self-propelled device 100 further includes a circuit board 112 upon which any number of electronic components may be installed or supported. These electronic components can include any combination of a memory resource, a processing means, sensors, a wireless communication port, and connection ports providing leads to the power units 122, 124, the motors 104, 106, and/or other components of the self-propelled device, as discussed in further detail below. A receiver 118 is provided and is coupled to the wireless communication port to allow for wireless communication with an external computing device providing control inputs for the self-propelled device 100. The receiver 118 can be an antenna array, and/or can be configured for a variety of communication standards, such as any radio frequency (RF) communication, including BLUETOOTH, short-range RF communication, and/or line of sight communication. Additionally or as an alternative, the receiver 118 may allow for the self-propelled device 100 to wirelessly connect to a variety of network technologies, including the Internet, World Wide Web, wireless links, wireless radio-frequency communications utilizing network protocol, optical links, or any available network communication technology. Examples of such network links comprise various radio frequency data communication systems, including, for example, those known as WI-FI, IEEE 802.11a, IEEE 802.11b, IEEE 802.11g, IEEE 802.11n, IEEE 802.11ac, IEEE 802.11ad, and/or 802.11ah. Other radio frequency data links may be formed using cellular telephone service or serial communication protocols using radio modems. Furthermore, optical communication links may be employed, including modulating properties of light and LASER beams.

One or more power units 122, 124 are included to store energy for operating the electronics and electromechanical components of the device 100. The power units 122, 124 can be any type of battery or energy storage unit suitable for installation within the device 100. For example, the power units 122, 124 can be rechargeable batteries such as lithium ion batteries. Additionally or as an alternative, the power units 122, 124 can be rechargeable via an inductive or wired charge port, which can be included to recharge the power units 122, 124 without the need for a wired electrical connection.

Figure 2:
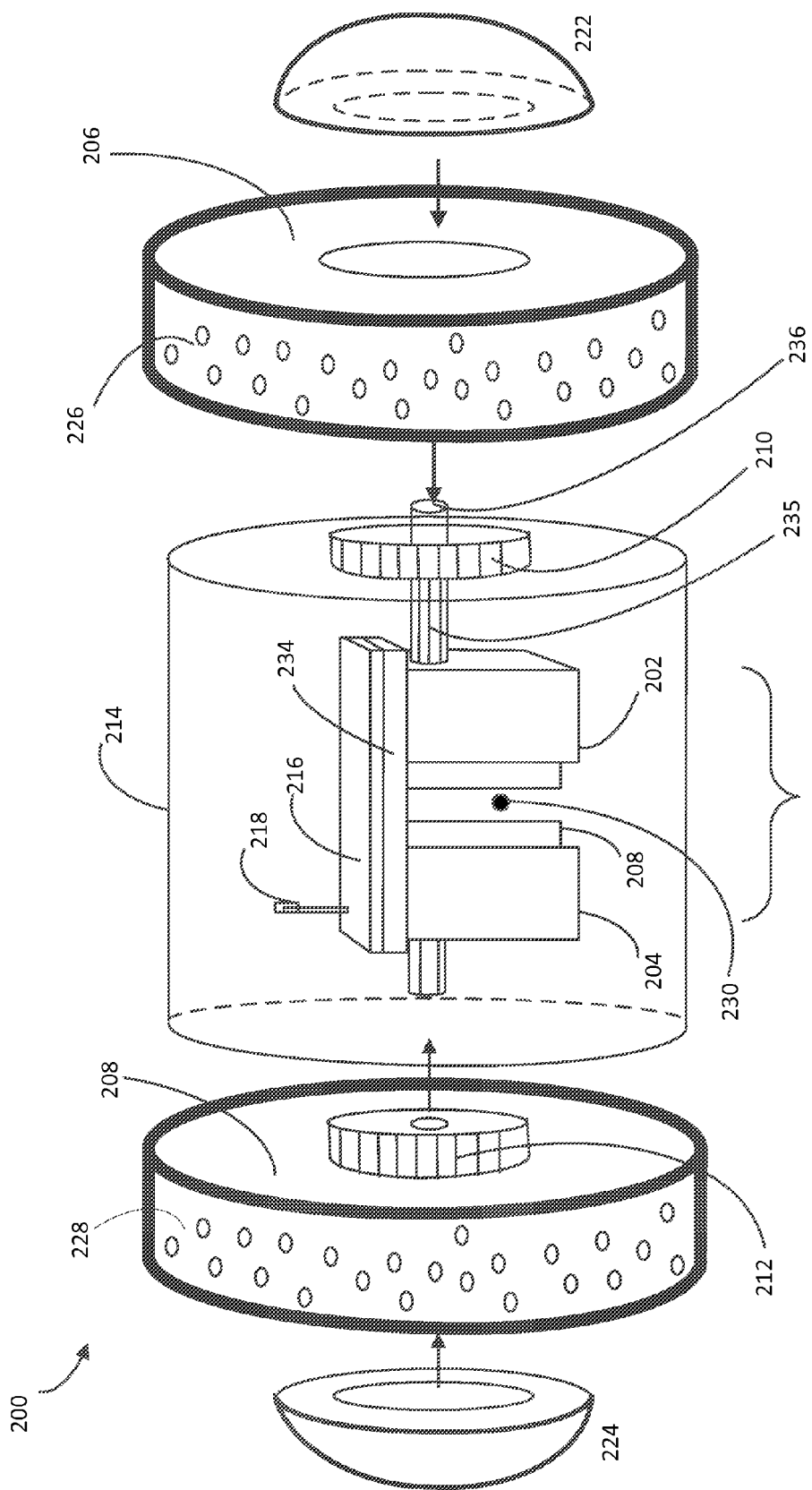
FIG. 2 is a block diagram illustrating an exploded view of an example tubular self-propelled device.

FIG. 2 is a block diagram illustrating an exploded view of an example cylindrical self-propelled device 200. When describing certain examples and details of FIG. 2, reference may be made to features and reference characters of FIG. 1. Furthermore, the self-propelled device 200 of FIG. 2 may include any combination of the previously discussed features with respect to FIG. 1. These include, without limitation, the drive system 205 including a left motor 202 and a right motor 204 with respective axles, one or more power units 208, a carrier 234, a circuit board 216 with any number of electronic components, and an receiver 218 which can be configured or included as any variety of wireless communication standards and/or technologies. Hereinafter, the above features may be referred individually or collectively as the "interior components" of the self-propelled device 200.

Referring to FIG. 2, the above features are included within a body 214 of the self-propelled device 200. Furthermore, any combination of the above features can be configured to be rigid to the body 214. For example, the carrier 234 can be mounted or otherwise attached to an inner portion of the body 214. Alternatively, any number interior components of the self-propelled device 200 can be coupled to the inner portion of the body 214. Accordingly, due to the interior components being rigid to the body 214, the body 214 can rotate in conjunction with the rotational pitch of the drive system 205 when the self-propelled device 200 is being maneuvered.

The body 214 is substantially cylindrical in shape and can include any number of designs and features. For example, the body can be at least partially transparent such that light from an internal light emitting component disposed within the body is apparent from outside of the device 200. The internal light emitting component can be any type of illuminating element, such as one or more light-emitting diodes (LEDs) or one or more LED arrays. The illuminating element can be affixed to the carrier 234, or any other interior component of the self-propelled device 200. As an addition or alternative, the body 214 can be comprised of sealed polycarbonate plastic or other composite that can be textured to diffuse light from the internal illuminating element.

Furthermore, the body 214 may be composed of a material that allows for transmission of signals used for wireless communication. Still further, an outer surface of the body 214 can be comprised of a material that is substantially impervious to moisture and every day wear and tear. The body 214 can be detachable from the self-propelled device 200 to allow for access to the interior components, and may further be durable, washable, and/or shatter resistant.

Additionally or as an alternative, the body 214 can include fastening or attachment points to allow for removable accessories to be attached to the exterior of the body 214. As discussed in further detail below, these accessories may include, for example, an attachable head lamp or a trailer attachment.

As shown in FIG. 2 for illustrative purposes, the gear 212 for a particular wheel 208 can be molded or formed at least partially within an interior portion of a wheel, such as illustrated by wheel 208. Alternatively, the gear 210 can be included as a portion of a power train in which the motor 202 is coupled to an axle 235 and gear 210 combination. Accordingly, the axle 235 and gear 210 combination may then be fitted to the wheel 206. Alternatively, an axle and gear combination can be formed at least partially within an interior portion of a wheel.

Still further, a wheel hub can be (i) formed at least partially within an outer portion of a respective wheel (not shown), (ii) formed in combination with a gear within an inner radius of a wheel (also not shown), or (iii) part of the power train attached to the gear 210 and axle 235. In the latter example, the wheel hub 236 can be a part of or coupled to the axle 235, and can further be configured to protrude from the outer portion of the wheel 206. The self-propelled device 200 can further incorporate removable hub covers 222, 224 that can be readily attached and detached from the wheel hubs 236. The hub covers 222, 224 may come in a variety of different colors and/or styles accordingly to a user's preference. Alternatively, the hub covers 222, 224 can be affixed semi-permanently to the wheel hubs 236. The hub covers 222, 224 may be made from a hard or soft plastic, plastic/rubber composite or compound, metal, or any other suitable material.

The wheels 206, 208 can allow for wheel coverings 226, 228 (e.g., tires) to be fitted over them. The wheel coverings 226, 228 can be removable and be formed of a soft rubber compound. However, the wheel coverings 226, 228 are not limited to soft rubber, and may be made of any compound. The wheel coverings 226, 228 may include any number of tread patterns for specialized or simply stylistic purposes. The wheel coverings 226, 228 can also come in a variety of different styles and/or colors according to a user's preference. In variations, the wheels 206, 208 have the same or substantially the same height as the body 214, and the wheel coverings 226, 228 can allow for a slight height advantage of the wheel and tire combination with respect to the body. Alternatively, the wheels 206, 208 can be significantly larger in height than the body 214.

Electronics

Figure 3:
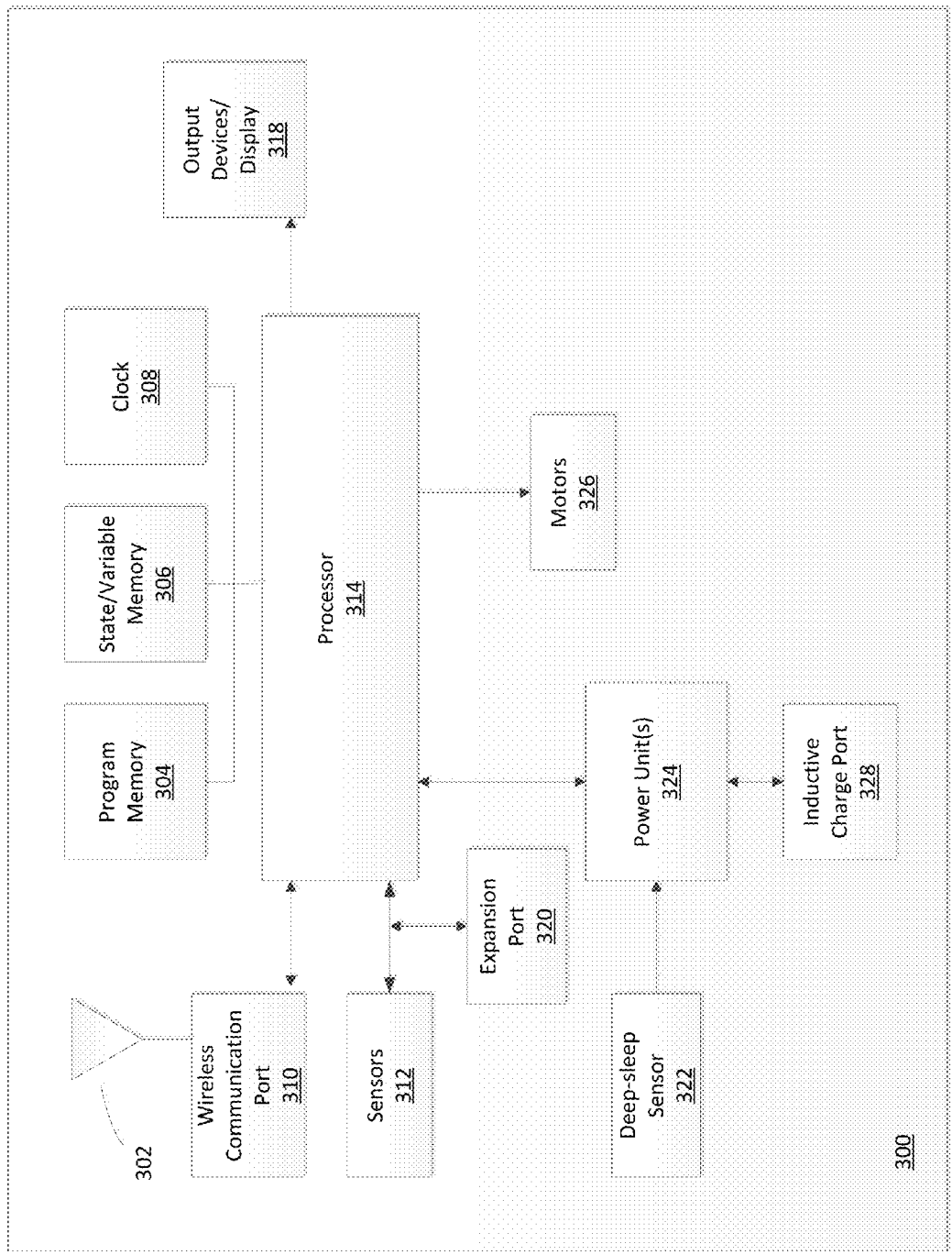
FIG. 3 is a schematic depiction of interior components of an example self-propelled device.

FIG. 3 is a schematic depiction of interior components of an example self-propelled device 300. The interior components can be supported on, for example, the circuit boards (112, 216) of FIGS. 1 and 2. Alternatively, certain interior components of the self-propelled device 300 can be mounted or otherwise attached or connected to any other interior component or even the inner surface of the body 214. Referring to FIG. 3, the self-propelled device 300 may be operated to move under the control of another device, such as an external computing device operated by a user. Furthermore, the self-propelled device 300 can be configured with resources that enable one or more of the following: (i) maintain self-awareness of orientation and/or position relative to an initial reference frame after the device initiates movement; (ii) process control inputs programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

Additionally, the self-propelled device 300 includes several interconnected subsystems and modules. For example, a processor 314 can execute programmatic instructions from a program memory 304. The instructions stored in the program memory 304 can be changed, for example to add features, correct flaws, or modify behavior. Furthermore, the program memory 304 can store programming instructions that are communicative or otherwise operable with software executing on a computing device. The processor 314 can further be configured to execute different programs of programming instructions, in order to after the manner in which the self-propelled device 300 interprets or otherwise responds to control input from another computing device. Additionally or as an alternative, the computing device executes a software application specific to controlling the self-propelled device 300 that automatically links the computing device to the self-propelled device 300.

The wireless communication port 310, in conjunction with a communication receiver 302, can serve to exchange data between the processor 314 and other external devices. The data exchanges, for example, provide communications, control, logical instructions, state information, and/or updates for the program memory 304. As an addition or alternative, the processor 314 can generate an output corresponding to state and/or position information, which can be communicated to the external computing device via the wireless communication port 310 and the receiver 302. The mobility of the device may make wired connections undesirable, so the term "connection" may be understood to mean a logical connection made without a physical attachment to self-propelled device 300.

The wireless communication port 310 may implement BLUETOOTH communications protocol and the receiver 302 may be suitable for transmission and reception of BLUETOOTH radio signals. However, alternatively, other wireless communication mediums and protocols may also be used.

The interior components may include sensors 312 that can provide information about the surrounding environment and condition to the processor 314. The sensors 312 can include inertial measurement devices, including a gyroscope, one or more accelerometers, and/or one or more magnetometers. The sensors 314 can provide inputs to enable the processor 314 to maintain awareness of the device's 300 orientation and/or position relative to an initial reference frame after the device initiates movement. Additionally or as an alternative, the sensors 312 include instruments for detecting light, temperature, humidity, and/or measuring chemical concentrations or radioactivity.

The self-propelled device can include a state/variable memory 306 which can store information about the present state of the device 300, including, for example, position, orientation, and rates of rotation. The state/variable memory 306 can also store information corresponding to an initial reference frame of the device upon, for example, the device being put in use (e.g., the device being switched on), as well as position and orientation information once the device is in use. In this manner, some embodiments provide for the device 300 to utilize information of the state/variable memory 306 in order to maintain position and orientation information of the device 300 when the device 300 is being controlled A clock 308 can be included to provide timing information to the processor 314. As such, the clock 308 provides a time-base for measuring intervals and rates of change. Additionally or alternatively, the clock 308 can provide day, date, year, time, and alarm functions, and can allow the device 300 to provide an alarm or alert at pre-set times.

An expansion port 320 can be included to provide a connection for additional accessories or devices. The expansion port 320 provides for future expansion, as well as flexibility to add options or enhancements. For example, the expansion port 320 can be used to add peripherals, sensors, processing hardware, storage, displays, or actuators to a basic self-propelled device 300. As such, the expansion port 320 can provide an interface capable of communicating with a suitably configured component using analog or digital signals. Additionally, the expansion port 320 can provide one or more electrical interfaces and/or protocols that are standard or well-known. The expansion port 320 can also implement an optical interface. Example interfaces that for the expansion port 320 include Universal Serial Bus (USB), Inter-Integrated Circuit Bus (I2C), Serial Peripheral Interface (SPI), or ETHERNET.

As an addition or alternative, a display 318 can be included to present visual cues or information to external devices or persons. For example, the display 318 can produce light in colors and patterns, and may be implemented in conjunction with an audio device and/or a vibrating component providing haptic responses to various conditions. The display 318 can further operate in conjunction with motors 326 to communication information by physical movements of the device 300.

In variations, the display 318 is a light emitting element, either in the visible or invisible range. Invisible light in the infrared or ultraviolet range may be useful, for example, to send information invisible to human senses but available to specialized detectors. Alternatively, the display 318 can include an array of LEDs and emit various frequencies of visible light, and can be arranged such that their relative intensity can vary and the light emitted may be blended to form color mixtures. As an addition or alternative, the display 318 includes an LED array comprising several LEDs. The processor 314 can be configured to vary the relative intensity of each of the LEDs or LED arrays to produce a wide range of colors. Primary colors of light can be emitted by each LED array and can be blended qualitatively to produce a wide gamut of apparent colors. For example, respective red, green, and blue LEDs comprise a usable set of three available primary-color devices comprising the display 318. However, other sets of colors and white LEDs can be utilized. Further, the display 318 can include an LED used to indicate a reference point on device 300 for alignment.

One or more power units 324 store energy for operating the electronics and electromechanical components of the device 300. The power units 324 can be comprised of one or more rechargeable lithium ion batteries. However, any type of energy storage units may be suitable for use as the power units 324, including alkaline, dry cell, aluminum ion, nickel oxyhydroxide, silver oxide, zinc, lead-acid, polymer-based, nickel iron, or nickel zinc batteries. Furthermore, a charge port 328 (e.g., inductive or USB) can be included to allow for recharging the power units 324 without a wired electrical connection. As such, the charge port 328 can recharge the power units 324 through an induction coil in the device 300 via an externally generated electromagnetic field of an induction charger.

In some variations, device 300 may further include a deep sleep sensor 322 to place the self-propelled device 300 into a very low power or "deep sleep" mode where most of the interior electrical components use little or no battery power. The deep sleep sensor 322 can sense through the body of the device 300 without a wired connection, and as such may be provided as a Hall Effect sensor mounted so that an external magnet can be applied at a pre-determined location on device 300 to activate the deep sleep mode. Additionally or as an alternative, the device 300 is placed in the deep sleep mode automatically upon placement on an induction charger, or otherwise upon activation of the charge port 328. Further still, the device can be placed in the deep sleep mode via a user input through an external computing device.

As an alternative or variation, a BLUETOOTH Low Energy mechanism can be utilized to maintain a low current draw that is responsive to a wireless signal. Such a variation can, for example, provide an alternative to the deep sleep mode.

Motors 326 are included to convert electrical energy from the power units 324 into mechanical energy and can be controlled by the processor 314. For example, the motors 326 can be in the form of the left and right motors (104, 106, 202, 204) of FIGS. 1 and 2. The primary purpose of the motors 326 is to activate the drive system in order to propel and steer the self-propelled device 300. However, the motors 326 also provide weight to the drive system and hang below the carrier to lower the center of mass of the self-propelled device. As such, the motors 326 can activate the drive system, the body, and/or other interior components of the self-propelled device to pitch rotationally, displacing the center of mass and causing the device 300 to move. Furthermore, the motors 326 can be variable-speed motors and apply power independently to each of the wheels through a reduction gear system. Each of the wheels can be mounted to an axle connected to a respective variable speed motor. As such, the delivered power of the motors can be controlled by the processor 314 to maneuver the device in any given direction.

Furthermore, the motors 326 can produce a variety of movements in addition to merely rotating and steering the device 300. Thus, control logic stored in the program memory 304 can implement the processor to actuate the motors 326 to cause the device 300 to execute a variety of complex movements and gestures, including nodding, shaking, trembling, spinning, or flipping. As such, the processor 314 can coordinate the motors 326 with the display 318 in order to provide visual association for such movements and gestures. For example, the processor 314 can provide signals to the motors 326 and the display 318 to cause the device 300 to spin or tremble and simultaneously emit patterns of colored light synchronized with the movements.

The self-propelled device 300 may be used as a controller for other network-connected devices. As such, the device 300 can include sensors and/or wireless communication capabilities to perform a controller role for other devices. For example, self-propelled device 300 can be held in a user's hand and used to sense gestures, movements, rotations, combination inputs and the like.

Operation and Communication Links

Figure 4A:
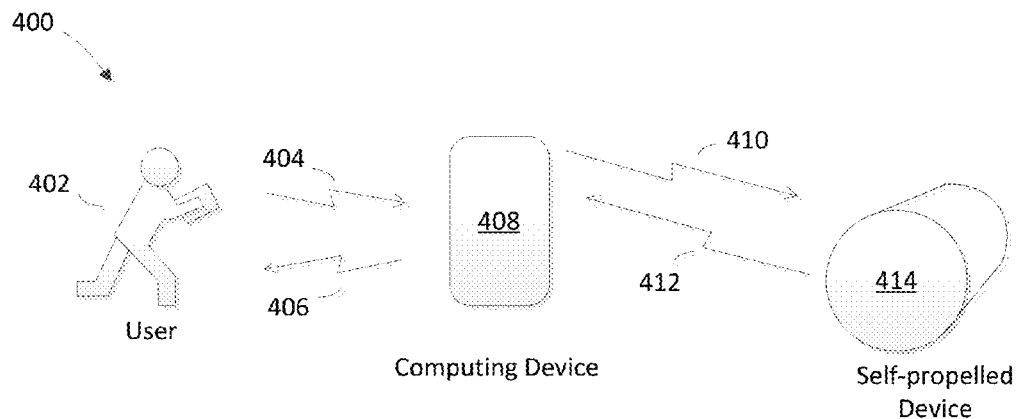
FIG. 4A is a schematic depiction of an example system comprising a self-propelled device and a computing device.

FIG. 4A is a schematic depiction of an embodiment comprising a self-propelled device 414 and a computing device 408 under control of a user 402. More specifically, the self-propelled device 414 can be controlled in its movement by programming logic and/or controls that can originate from the computing device 408. The computing device 408 can wirelessly communicate control data to the self-propelled device 414 using a standard or proprietary wireless communication protocol. In variations, the self-propelled device 414 may be at least partially self-controlled, utilizing sensors and internal programming logic to control the parameters of its movement (e.g., velocity, direction, etc.). Still further, the self-propelled device 414 can communicate data relating to the device's position and/or movement parameters for the purpose of generating or alternating content on the computing device 408. In additional variations, the self-propelled device 414 can control aspects of the computing device 408 by way of its movements and/or internal programming logic.

As described herein, the self-propelled device 414 can have multiple modes of operation, including those of operation in which the device is controlled by the computing device 408, is a controller for another device (e.g., another self-propelled device or the computing device 408), and/or is partially or wholly self-autonomous.

Additionally, the self-propelled device 414 and the computing device 408 may share a computing platform on which programming logic is shared in order to enable, among other features, functionality that includes: (i) enabling the user 402 to operate the computing device 408 to generate multiple types of inputs, including simple directional input, command input, gesture input, motion or other sensory input, voice input or combinations thereof; (ii) enabling the self-propelled device 414 to interpret inputs received from the computing device 408 as a command or set of commands; and/or (iii) enabling the self-propelled device 414 to communicate data regarding that device's position, movement and/or state in order to effect a state on the computing device 408 (e.g., display state, such as content corresponding to a controller-user interface). Additionally or as an alternative, the self-propelled device 414 can further include a programmatic interface that facilitates additional programming logic and/or instructions to use the device. The computing device 408 can further execute programming that is communicative with the programming logic on the self-propelled device 414.

Additionally, the self-propelled device 414 can include an actuator or drive mechanism causing motion or directional movement. The self-propelled device 414 can be referred to by a number of related terms and phrases, including controlled device, robot, robotic device, remote device, autonomous device, and remote-controlled device. Furthermore, the self-propelled device 414 can be structured to move and be controlled in various media. For example, the self-propelled device 414 can be configured for movement in media such as on flat surfaces, sandy surfaces rocky surfaces, etc.

The self-propelled device 414 can be implemented in various forms. As described above with respect to FIGS. 1 and 2, the self-propelled device 414 can correspond to a tube-shaped object that can roll and/or perform other movements such as spinning. In variations, the device 414 can correspond to a radio-controlled aircraft, such as an airplane, helicopter, hovercraft or balloon. In other variations, the device 414 can correspond to a radio controlled watercraft, such as a boat or submarine. Numerous other variations may also be implemented, such as those in which the device 414 is a robot. Further still, the device 414 can include a sealed hollow body, roughly cylindrical in shape, and capable of directional movement by action of actuators or motors inside the enclosed body.

Continuing to refer to FIG. 4A, the device 414 can be configured to communicate with the computing device 408 using network communication links 410 and 412. For example, link 410 transfers data from the computing device 408 to the self-propelled device 414. Furthermore, link 412 transfers data from the self-propelled device 414 to the computing device 408. Links 410 and 412 are shown as separate unidirectional links for illustrative purposes, however, a single bi-directional communication link can be utilized to perform communication in both directions. Furthermore, links 410 and 412 are not necessarily identical in type, bandwidth or capability. For example, the communication link 410 from the computing device 408 to the self-propelled device 414 can be capable of a higher communication rate and bandwidth compared to the link 412 from the self-propelled device 414 to the computing device 408. In some situations, only one unidirectional link can be established between the computing device 408 and the self-propelled device 414 such that the self-propelled device 414 is capable of being controlled via the computing device 408.

The computing device 408 can correspond to any device comprising at least a processor and communication capability suitable for establishing at least unidirectional communications with the self-propelled device 414. Examples of such devices include, without limitation: mobile computing devices (e.g., multifunctional messaging/voice communication devices such as smart phones), tablet computers, portable communication devices and personal computers. Thus, the computing device 408 may be an IPHONE available from APPLE COMPUTER, INC. of Cupertino, Calif. Alternatively, the computing device 408 may be an IPAD tablet computer, also from APPLE COMPUTER. Alternatively, the computing device 408 may be any of a variety of handheld computing devices and communication appliances executing an ANDROID operating system from GOOGLE, INC. of Mountain View, Calif.

Alternatively, the computing device 408 may be a personal computer, in either a laptop or desktop configuration. For example, the computing device 408 may be a mufti-purpose computing platform running a MICROSOFT WINDOWS operating system, or a LINUX operating system, or an APPLE operating system, configured with an appropriate application program to communicate with the self-propelled device 414. However, in variations, the computing device 408 can be a specialized device, dedicated for enabling the user 402 to control and interact with the self-propelled device 414.

Additionally or as an alternative, multiple types of computing devices can be used interchangeably to communicate with the self-propelled device 414. Thus, the self-propelled device 414 may be capable of communicating and/or being controlled by multiple devices (concurrently or one at a time). For example, the self-propelled device 414 can link with an IPHONE in one session and with an ANDROID device in a later session, without modification of the self-propelled device 414.

Accordingly, the user 402 can interact with the self-propelled device 414 via the computing device 408 in order to control the self-propelled device 414 and/or to receive feedback or interaction on the computing device 408 from the self-propelled device 414. Furthermore, the user 402 may be enabled to specify input 404 through various mechanisms that are provided with the computing device 408. Examples of such inputs include text entry, voice command, touching a sensing surface or screen of the computing device 408, physical manipulations, gestures, taps, shaking and combinations of the above. Additionally or alternatively, the input 404 is made via an application specific to controlling the self-propelled device 414. Such an application can provide a graphical interface that allows for powering and steering the self-propelled device 414.

Further still, the user 402 can interact with the computing device 408 in order to receive feedback 406. The feedback 406 can be generated on the computing device 408 in response to the user input 404. As an addition or alternative, the feedback 406 can also be based on data communicated from the self-propelled device 414 to the computing device 408, regarding, for example, the self-propelled device's 414 position or state. Without limitation, examples of feedback 406 include text display, graphical display, sound, music, tonal patterns, modulation of color and/or intensity of light, haptic, vibrational, and/or tactile stimulation. The feedback 406 can be combined or otherwise synchronized with input that is generated on the computing device 408. For example, the computing device 408 may output content that is modified to reflect position or state information communicated from the self-propelled device 414.

In some embodiments, the computing device 408 and/or the self-propelled device 414 can be configured such that the user input 404 and the feedback 406 can maximize usability and accessibility for the user 402, who may have limited sensing, thinking, perception, motor skills, or other limited abilities. This can allow users with handicaps or special needs to operate within the system 400 as described.

Example configurations described and illustrated in FIG. 4A are only a few of many possible configurations of networks including a self-propelled device 414 with wireless communication capability. Furthermore, while numerous embodiments described herein provide for the user 402 to operate or otherwise directly interface with the computing device 408 in order to control and/or interact with the self-propelled device 414, variations to embodiments described encompass enabling the user 402 to directly control or interact with the self-propelled device 414 without the use of an intermediary device such as the computing device 408.

Figure 4B:
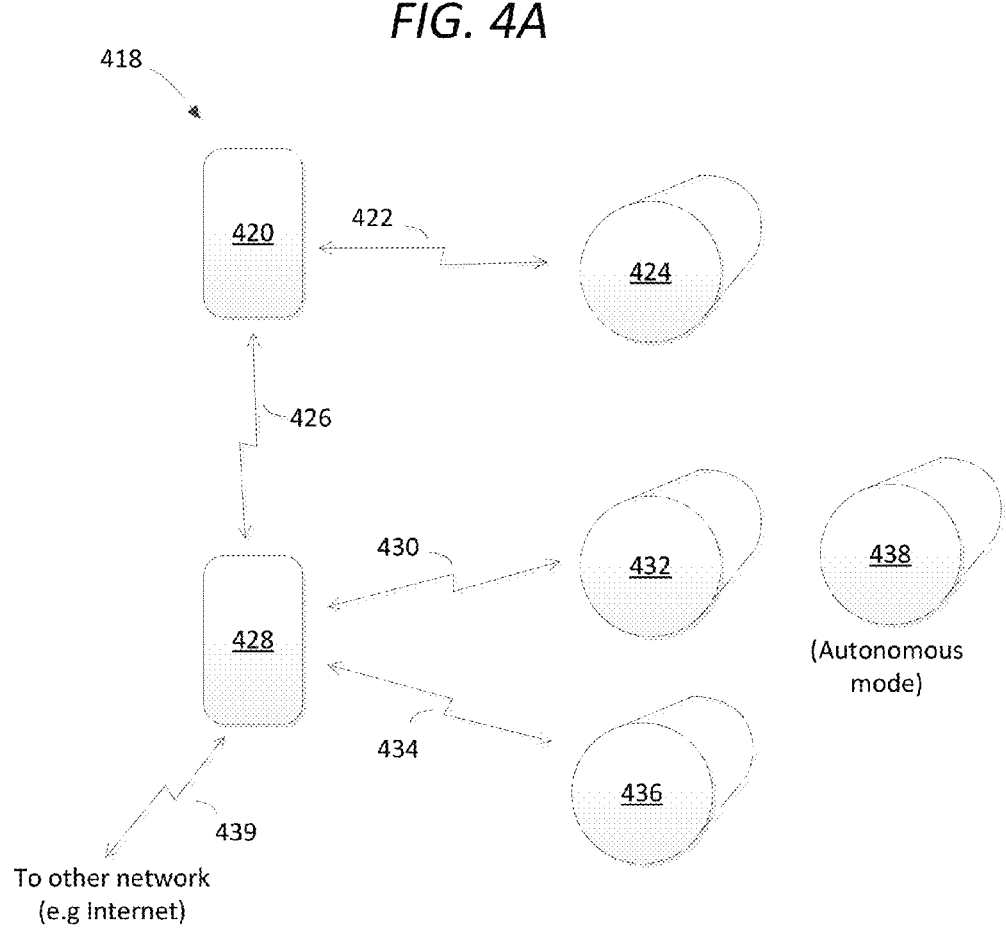
FIG. 4B depicts an example system comprising computing devices and self-propelled devices.

FIG. 4B depicts a system 418 comprising a plurality of computing devices (420, 428) and self-propelled devices (424, 432, 436, 438). In the examples provided by FIG. 4B, system 418 includes a first computing device 420, a second computing device 428, four self-propelled devices 424, 432, 436, and 438, and communication links 422, 426, 430, 434 and 439. The communication of the first computing device 420 with the self-propelled device 424 using the link 422 is similar to the embodiment depicted in the system 400 of FIG. 4A. However, additional communication can be established between the two computing devices 420, 428 via the network link 426.

Further, the first and second computing devices 420, 428 can optionally control more than one self-propelled device. Further still, each self-propelled device 424, 432, 436, 438 can be controlled by more than one computing device 420, 428. For example, the second computing device 428 can establish multiple communications links, including with the self-propelled devices 432 and 436, and the first computing device 420.

In variations, the first and second computing devices 420, 428 can also communicate with one or more self-propelled devices using a network such as the Internet, or a local wireless network (e.g., a home network). For example, the second computing device 428 is shown to have a communications link 439, which can connect the seconding computing device 428 to an Internet server, a web site, or to another computing device at a remote location. As such, the second computing device 428 can serve as an intermediary between the network source and one or more self-propelled devices. For example, the second computing device 428 can access programming from the Internet and communicate that programming to one of the self-propelled devices.

As an alternative or variation, the computing device 428 can enable a network user to control the second computing device 428 in controlling one or more of the self-propelled devices 432, 436, etc. Still further, the computing device 428 can access the network source in order to receive programmatically triggered commands, such as a command initiated from a network service that causes one or more of the self-propelled devices to update or synchronize using the computing device 428. For example, the self-propelled device 432 can include image capturing resources, and a network source can trigger the computing device 428 to access the images from the self-propelled device, and/or to communicate those images to the network source over the Internet.

In variations, such remote network functionality can alternatively be communicated directly from a network source to the self-propelled devices 424, 432, 436. Thus, the first and second computing devices 420, 428 may be optional. Alternatively, the first and second computing devices 420, 428 may be separated from the self-propelled devices 424, 432, 436 by a network such as the Internet. Thus, the computing devices 420, 428 can alternatively be the network sources that remotely control and/or communicate with the self-propelled devices.

Figure 4C:
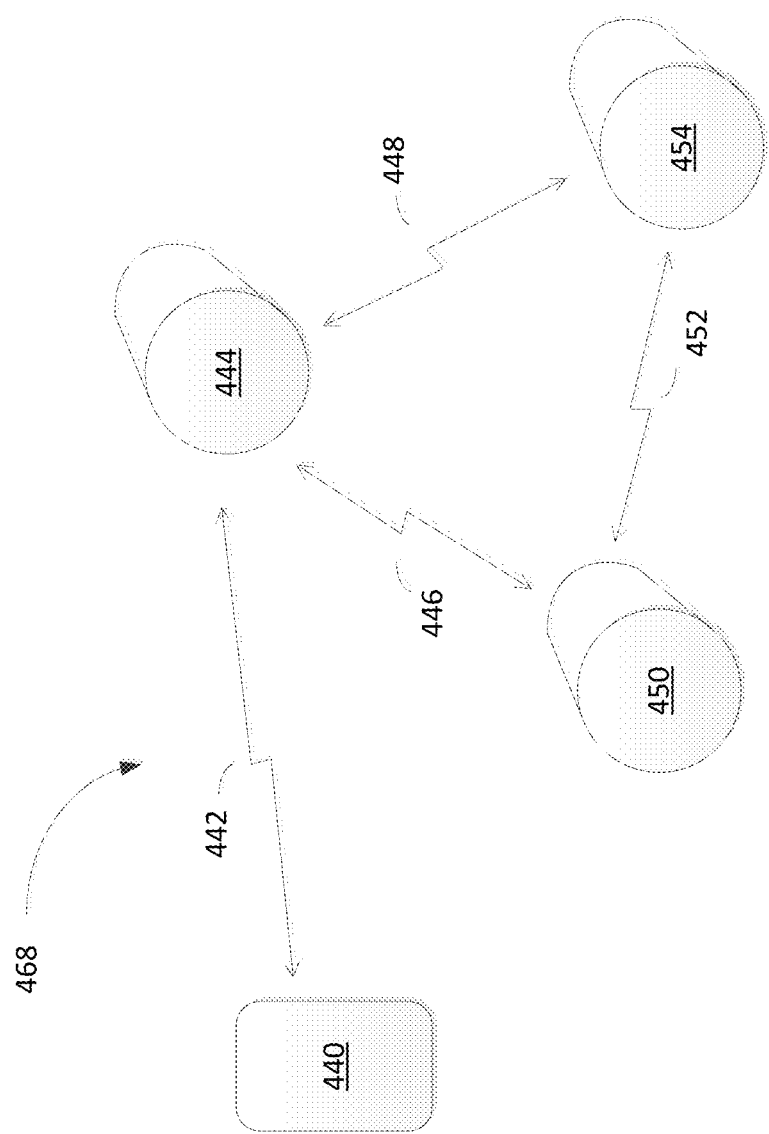
FIG. 4C is a schematic depiction that illustrates an example system comprising a computing device and multiple self-propelled devices.

Data communication links depicted in FIGS. 4A, 4B, and 4C are shown as short and direct for purposes of illustration. However, actual links may be much more varied and complex. For example, link 426 connecting the two computing devices 420, 428 can be a low-power wireless link if the computing devices 420 and 428 are in close proximity. However, the computing devices 420, 428 can be spaced a great distance apart (e.g., separated by miles or geographic barriers) so long as suitable network communication can be established. Thus, the link 426, and all other links 422, 430, 434, and 439 can employ a variety of network technologies, including the Internet, World Wide Web, wireless links, wireless radio-frequency communications utilizing network protocol, optical links, or any available network communication technology. The final connection to self-propelled devices 424, 432, 436 and 438 may also be wireless so connecting wires do not restrict mobility.

For example, the communication links 422, 426, 430 and 434 may be based on the BLUETOOTH wireless communication standard. BLUETOOTH is widely available and provides a flexible communication platform for establishing data networks using short-wavelength radio transceivers and data encoding. Furthermore, BLUETOOTH incorporates security features to protect the data sent on the links from unauthorized observers or interference. Alternative wireless communication medium may also be employed, such as wireless USB, Wi-Fi, or proprietary wireless communications. Furthermore, one or more of the communication links 422, 426, 430 and 434 may utilize short-range radiofrequency (RF) communication, and/or line-of-sight communications.

Additionally or alternatively, the communication links may be based on other wireless communication systems, such as Wi-Fi, IEEE 802.11a, 802.11b, 802.11g, 802.11n, 802.11ac, 802.11ad, and/or 802.11ah standards. However, other radio frequency data links may be created using other cellular telephone service or serial communication protocols using radio modems. Alternatively, optical communication links may be employed, including modulating properties of light and LASER beams. Further, any suitable communication technology can be used to form the network links, whether presently known or available in the future. As such, the features described herein are not dependent on any particular networking technology or standard.

Further still, the communication established amongst the devices, such as amongst the computing devices 420, 428 and/or the self-propelled devices 424, 432, 436, can be temporary, flexible, and/or reconfigurable. A resulting network of such devices can be considered an "ad-hoc" network, or alternatively a "piconet" or "personal area network." In this respect, some implementations provide that the computing device's 420, 428 and the self-propelled devices 424, 432, 436 can be considered nodes of the network, such as an ad-hoc network. In such configurations, network components, topology and communications paths are flexible and can be readily adjusted to accommodate addition or removal of devices, changing communication requirements or channel interference. For example, the self-propelled device 438 in FIG. 4B is shown with no present network connection. However, the self-propelled device 438 may have connected to the network 418 in the past and received instructions to enable it to operate without a persistent network link.

FIG. 4C is a schematic that illustrates a system 468 comprising a computing device 440 and multiple self-propelled devices 444, 450, 454. The computing device 440 can be operable to communicate with one or more self-propelled devices 444, 450, 454. The computing device 440 can communicate commands or other control data, and receive feedback similar to variations described above. The self-propelled devices 444, 450, 454 can be configured to communicate and/or be controlled by the computing device 440. Additionally, the self-propelled devices 444, 450, 454 can be configured to communicate and/or control one another.

In examples shown by FIG. 4C, the computing device 440 can communicate with a primary self-propelled device 444 using communications link 442. The primary self-propelled device 444 can then communicate with another self-propelled device 450 using a separate link 446 and with a third self-propelled device 454 using another separate link 448. Also, the self-propelled devices 450, 454 can communicate with each other using the communication link 452. The computing device 450 can send data to any of the other self-propelled devices 450, 454, using the primary self-propelled device 444 as a relay. Alternatively, the computing device 440 can communicate with the other self-propelled devices 450, 454 directly.

The system 468 can include various configurations. For example, a user can operate the computing device 440 to control the primary self-propelled device 444. Movement of the primary self-propelled device 444 can be communicated both to the computing device 440 and to one or more of the other self-propelled devices 450, 454. Each of the self-propelled devices can be preprogrammed to react in a specific manner based on state or position information communicated from another one of the self-propelled devices. For example, the self-propelled devices 450, 454 can each be operated in a repel mode, so that the movement of the primary self-propelled device 444 (as controlled from the computing device 440) results in a repel motion by the other self-propelled device 450. In other variations, the self-propelled devices 444, 450, 454 may be preprogrammed to maintain a specific distance apart from one another, so that movement by one device automatically causes movement by the other two devices. Still further, the self-propelled devices 444, 450, 454 may be configured so as to perform a variety of activities, such as, for example, (i) one self-propelled device automatically moving when another approaches a threshold distance; (ii) one self-propelled device programmatically moving to bump another self-propelled device; (iii) the self-propelled devices automatically moving in tandem based on input received by each of the self-propelled devices from the other self-propelled devices or from the computing device 440, and/or variations thereof.

The various systems 400, 418, 468 are for illustrative purposes. With any of the systems described, variations include the addition of more or fewer computing devices, and/or more or fewer self-propelled devices. As described with some variations, additional sources or nodes can be provided from a remote network source. Additionally, in some operational environments, the presence of the computing device is optional. For example, the self-propelled devices can be partially or completely autonomous, using programming logic to function.

Figure 5:
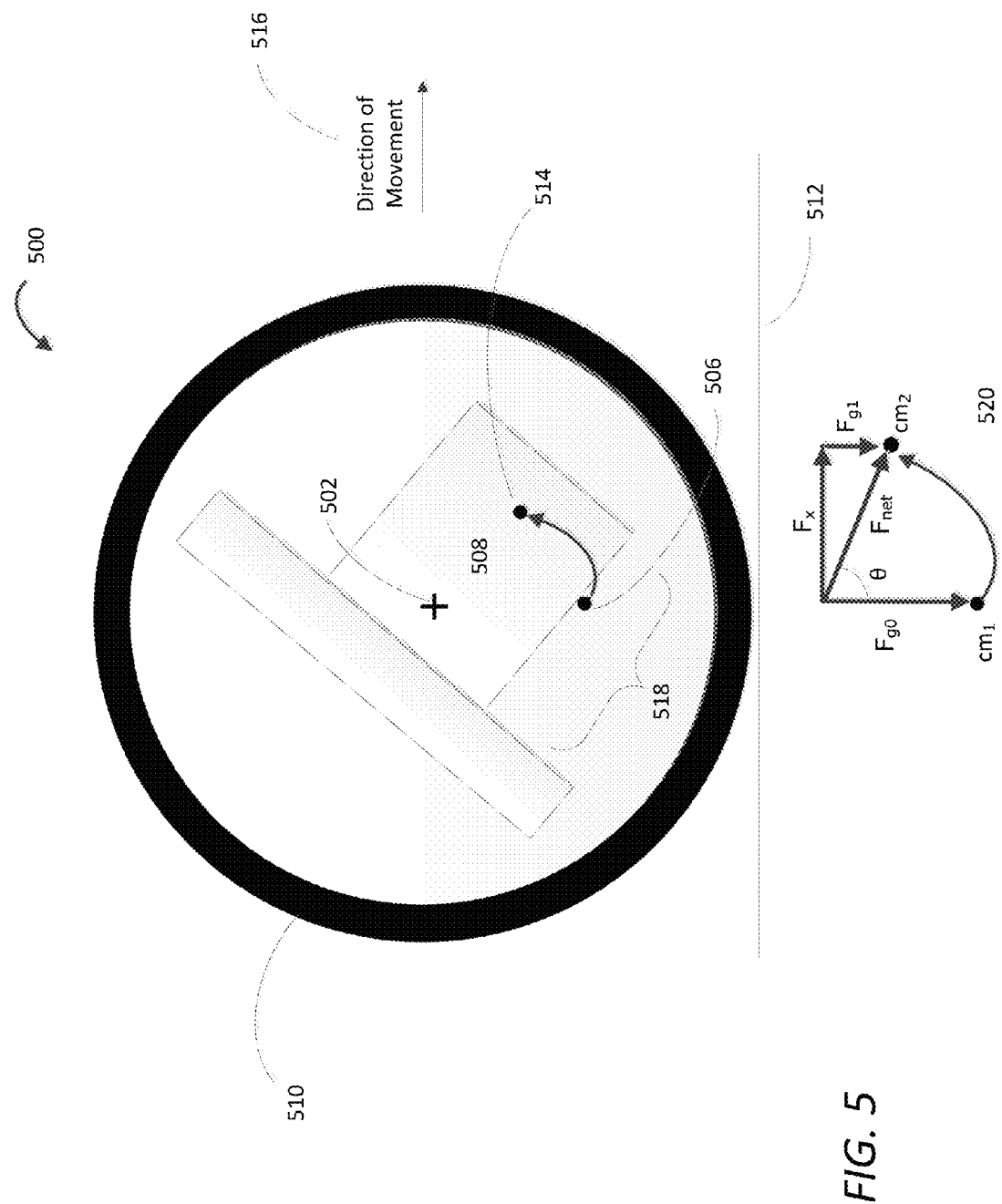
FIG. 5 illustrates a mechanism for moving the self-propelled device.

FIG. 5 illustrates a mechanism for moving the self-propelled device 500. As illustrated in FIG. 5, the cylindrical self-propelled device 500 is shown from a side perspective along a center of rotation 502, or along an axis corresponding to the wheel axles. As further illustrated in FIG. 5, the self-propelled device 500 has an "at rest" center of mass 506 that is below the center of rotation 502, with the outer circumferences of the wheels or tires 510 in contact with a surface 512. The drive mechanism for the self-propelled device 500 can include two independently-controlled motors 508 (second motor not shown), each providing power to a respective wheel. Several components of device 500 are not shown in FIG. 5 for simplicity of illustration.

The cylindrical self-propelled device 500 can move linearly forward by essentially displacing the at rest center of mass 506 (first point) to the "actual" center of mass 514 (second point) by pitching the entire drive system 518 and/or the other interior components of the self-propelled device 500 forward and upward relative to center of rotation 502 by action of the motors 508. For example, the motors 508 can actuate in conjunction to pitch the drive system 518 forward and upward such that the center of mass is displaced from the first point 506 to the second point 514. Such displacement of the center of mass causes the self-propelled device 500 to roll forward in the direction of movement 516. For practical purposes, the angle of pitch can be any angle between 0-90 degrees, although angles higher than 90 degrees may result from rapid acceleration of the self-propelled device 500.

Actuation of the motors 508 allowing for rotational pitch of the drive system 518 may be achieved in any number of ways. For example, a mass of the wheels, tires 510, and hub covers collectively may be greater than a mass of the body and interior components of the self-propelled device 500. This causes rotation of the body and interior components initially, which in turn causes the center of mass to be displaced, allowing the self-propelled device 500 to "fall" towards the displaced center of mass. A weight ratio between the wheels and the interior components may be substantially equivalent, between 1:1 and 2:1. However, any suitable weight ratio between the wheels and interior components can be utilized to drive the self-propelled device 500 in the above manner.

Referring still to FIG. 5, motion of the self-propelled device 500 can be visualized in simple a vector diagram 520. The vector diagram 520 illustrates a simplified view of the forces acting on the self-propelled device 500 as the drive system 518 is rotationally pitched. At rest, the center of mass is located at $cm_1$ with only the force of gravity ($F_{g0}$) acting on the device 500. When power is applied by the motors 508 in conjunction, the drive system 518 is pitched at an angle θ, displacing the center of mass from $cm_1$ to $cm_2$. Given that the $F_g$ vector has a constant direction, a net force acting on the self-propelled device ($F_{net}$) can be visualized in the direction from the axis of rotation to $cm_2$ (as shown) with a value equal to $F_{g0}$. As shown in the vector diagram 520, a net gravitational force acting on the device 500 can be visualized as $F_{g1}$, leaving only a lateral force ($F_x$) acting on the self-propelled device 500 in the direction of movement 516.

FIGS. 6A and 6B illustrate examples for causing directional change of the self-propelled device viewed from above. Referring to FIG. 6A, the cylindrical self-propelled device 600 can initially be at rest or moving linearly. With respect to linear motion, the right and left motors 602, 604 may act on the wheels 606, 608 in conjunction. As viewed from above, a control on the self-propelled device 600 to turn left, for example, may be processed via programmatic commands to add more power to the right motor 602 in relation to the left motor 604, causing the self-propelled device 600 to turn left. Alternatively, the programmatic commands may instruct the left motor 604 to reduce power relative to the right motor 602, also causing the self-propelled device 600 to turn left.

Similarly, FIG. 6B illustrates a similar process for causing directional change of the self-propelled device 610. In examples of FIG. 6B, the cylindrical self-propelled device 610 may also initially be at rest or moving linearly. With respect to linear motion, the left and right motors 612, 614 can act on the wheels 616, 618 in conjunction. As viewed from above, a control on the self-propelled device 610 to turn right, for example, can also be processed via programmatic commands to add more power to the left motor 612 in relation to the right motor 614, causing the self-propelled device 610 to turn right. Alternatively, the programmatic commands can instruct the right motor 614 to reduce power relative to the left motor 612, also causing the self-propelled device 610 to turn left.

FIGS. 7A and 7B illustrate examples of self-propelled devices 700, 710 with attached example accessories. The self-propelled devices 700, 710 are cylindrical in shape and at least substantially the same as those discussed above. As shown in FIG. 7A, the cylindrical self-propelled device 700 can include a fastening means 702 such as a clasp or other suitable fastener to attach any number of accessories. The example of FIG. 7A shows an illuminating element 704, such as a headlamp, fastened to the body of the self-propelled device 700. The example of FIG. 7B shows a trailer 714 being towed behind the self-propelled device 710. In such examples, the fastening means 712 can be more complex and involve any number of components allowing for proper attachment of a variety of accessories.

Conclusion

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that this disclosure is not limited to those precise embodiments. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with FIGs below provide examples of processing resources and computer-readable mediums on which instructions for implementing embodiments can be carried and/or executed. In particular, the numerous machines shown with embodiments include processor(s) and various forms of memory for holding data and instructions. Examples of computer-readable mediums include permanent memory storage devices, such as hard drives on personal computers or servers. Other examples of computer storage mediums include portable storage units (such as CD or DVD units), flash memory (such as carried on many cell phones and tablets)), and magnetic memory. Computers, terminals, network enabled devices (e.g., mobile devices such as cell phones) are all examples of machines and devices that utilize processors, memory and instructions stored on computer-readable mediums. Additionally, embodiments may be implemented in the form of computer-programs, or a computer usable carrier medium capable of carrying such a program.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While certain embodiments have been described above, it will be understood that the embodiments described are by way of example only. Accordingly, this disclosure should not be limited based on the described embodiments. Rather, the scope of the disclosure should only be limited in light of the claims that follow when taken in conjunction with the above description and accompanying drawings.

What is claimed is:

1. A self-propelled device comprising:
   a substantially cylindrical body;
   a drive system comprising a carrier, a left motor to operate a left wheel, a right motor to operate a right wheel, and one or more power units to power the left and right motors, wherein the left motor and the right motor are each mounted to hang freely from the carrier between the left and right wheels and below a common rotational axis of both the left and right wheels;
   a receiver coupled to the carrier to receive control inputs from a mobile computing device; and
   a processor coupled to the circuit board to:
      in response to execution of a software application on the mobile computing device, establish a wireless communication link with the mobile computing device to receive, via the receiver, the control inputs; and
      process the control inputs for maneuvering the self-propelled device by independently operating the left motor and the right motor;
   wherein actuation of the left motor and the right motor by the processor causes the left and right motors, hanging freely from the carrier, to pitch rotationally, causing a displacement in the center of mass of the self-propelled device in order to propel the self-propelled device.

2. The self-propelled device of claim 1, wherein a height of both the left and right wheels is substantially equivalent to a height of the substantially cylindrical body.

3. The self-propelled device of claim 2, wherein the substantially cylindrical body includes one or more fastening means to fasten one or more attachable accessories to the self-propelled device.

4. The self-propelled device of claim 3, wherein the one or more attachable accessories includes a light-emitting element.

5. The self-propelled device of claim 3, wherein the one or more attachable accessories includes a trailer attachment.

6. The self-propelled device of claim 3, wherein the one or more attachable accessories includes a camera.

7. The self-propelled device of claim 1, further comprising removable wheel coverings to fit around each of the left and right wheels.

8. The self-propelled device of claim 1, further comprising detachable wheel covers coupled to a wheel hub on each of the left and right wheels.

9. The self-propelled device of claim 1, wherein the self-propelled device is operable in a plurality of modes, including an autonomous mode and a controlled mode.

10. The self-propelled device of claim 1, wherein the processor (i) interprets the control inputs as one or more commands, and (ii) implements a control on the drive system based at least in part on the one or more commands.

11. The self-propelled device of claim 1, further comprising:
    an inductive charge port coupled to the one or more power units, the inductive charge port to recharge the one or more power units via an induction charger.

12. The self-propelled device of claim 11, wherein the processor activates a deep sleep mode upon activation of the inductive charge port to recharge the one or more power units.

13. The self-propelled device of claim 1, wherein the drive system is rigid to the substantially cylindrical body, causing the substantially cylindrical body to rotate in conjunction with the rotational pitch of the drive system.

14. The self-propelled device of claim 13, further comprising a left gear coupling the left motor to the left wheel, and a right gear coupling the right motor to the right wheel, wherein the left and right gears are respectively rigid to the left and right wheels.

15. The self-propelled device of claim 14, wherein the left and right motors are configured to engage in concert to rotationally pitch the drive system, allowing for linear motion of the self-propelled device in directions perpendicular to the common rotational axis of the left and right wheels.

16. The self-propelled device of claim 15, wherein the left and right motors are further configured to engage independently in order to cause directional change of the self-propelled device.

17. The self-propelled device of claim 1, wherein the processor utilizes one or more inertial measurement devices of the self-propelled device to maintain awareness of an initial reference frame after the self-propelled device initiates movement.

18. The self-propelled device of claim 1, further comprising a memory coupled to the processor, the memory to store programmatic instructions that translate the control inputs into commands for operating each of the left motor and the right motor.

19. The self-propelled device of claim 1, wherein the communication link comprises a BLUETOOTH low energy communication link, and wherein the executing software application is unique to controlling the self-propelled device.

20. The self-propelled device of claim 18, wherein the processor further (i) stores information corresponding to an initial frame of reference of the self-propelled device in the memory when the self-propelled device is initiated, and (ii) maintains position and orientation information of the self-propelled device, relative to the initial frame of reference, when the self-propelled device controlled by the mobile computing device executing the software application.

* * * * *